US012386836B2

(12) United States Patent
Gampa et al.

(10) Patent No.: US 12,386,836 B2
(45) Date of Patent: Aug. 12, 2025

(54) METHODS AND SYSTEMS FOR IMPLEMENTING A UNIFIED DATA FORMAT FOR ARTIFICIAL INTELLIGENCE SYSTEMS

(71) Applicant: LIVEPERSON, INC., New York, NY (US)

(72) Inventors: Ranjith Gampa, New York, NY (US); James Poulin, New York, NY (US); Jesse Wang, New York, NY (US); Ravi Gadekarla, New York, NY (US); Manoj Potturu, New York, NY (US); Ravikiran Chittari, Cupertino, CA (US); Akhila Ravela, New York, NY (US); Deepali Kale, New York, NY (US); Snigdha Sivadas, New York, NY (US); Trupti Chinchghare, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 18/396,548

(22) Filed: Dec. 26, 2023

(65) Prior Publication Data
US 2024/0211477 A1 Jun. 27, 2024

Related U.S. Application Data

(60) Provisional application No. 63/435,394, filed on Dec. 27, 2022.

(51) Int. Cl.
*G06F 16/22* (2019.01)
*G06F 16/2455* (2019.01)

(52) U.S. Cl.
CPC ...... *G06F 16/2455* (2019.01); *G06F 16/2237* (2019.01)

(58) Field of Classification Search
CPC .......... G06F 16/2455; G06F 16/2237
(Continued)

(56) References Cited

U.S. PATENT DOCUMENTS 5,930,754 A * 7/1999 Karaali .......... G10L 13/08
704/E13.011
7,860,881 B2 * 12/2010 Haselden ....... G06F 16/90344
707/769
(Continued)

OTHER PUBLICATIONS

International Search Report and Written Opinion of Apr. 25, 2024 for PCT Application No. PCT/US2023/085938, 15 pages.
(Continued)

*Primary Examiner* — Hanh B Thai
(74) *Attorney, Agent, or Firm* — POLSINELLI LLP

(57) ABSTRACT

Systems and method are provided for artificial-intelligence-based formatting of data into interface-specific representations. A computing device may receive datasets including information structured for presentation through various interfaces. The computing device may train a machine-learning model using feature vectors defined from the datasets. The machine-learning model may be trained to generate interface-specific representations of data. The computing device may then receive a query through a first type of interface and execute the trained machine-learning model using the query and an identification of the first type of interface. The machine-learning model may generate a response to the query that includes a structure tailored for interfaces that correspond to the first type of interface. The computing device may then facilitate a transmission of the response to the query through an interface that corresponds to the first type of interface.

20 Claims, 6 Drawing Sheets

(58) Field of Classification Search
USPC .......................................................... 707/722
See application file for complete search history.

(56) References Cited

U.S. PATENT DOCUMENTS

| | | | |
|---|---|---|---|
| 10,997,187 B2* | 5/2021 | Aggour | G06N 5/02 |
| 11,379,537 B2* | 7/2022 | Chatelain | G06F 16/9038 |
| 11,487,720 B2* | 11/2022 | Wilczynski | G06F 16/212 |
| 11,526,261 B1* | 12/2022 | Leach | G06F 17/18 |
| 11,556,510 B1* | 1/2023 | Hanson | G06F 16/215 |
| 11,593,413 B2* | 2/2023 | Vangala | G06F 16/3329 |
| 11,593,671 B2* | 2/2023 | Zou | G06F 16/9536 |
| 11,763,096 B2* | 9/2023 | Tunstall-Pedoe | G10L 15/1815 704/9 |
| 11,888,801 B2* | 1/2024 | Matsuoka | G06F 40/20 |
| 2016/0098415 A1* | 4/2016 | Mejeoumov | G06F 16/13 707/741 |
| 2016/0148116 A1* | 5/2016 | Bornea | G06N 5/022 706/12 |
| 2017/0091320 A1* | 3/2017 | Psota | G06F 16/3337 |
| 2018/0197066 A1* | 7/2018 | Osotio | G06N 5/022 |
| 2018/0330277 A1* | 11/2018 | Ho | G06N 5/022 |
| 2019/0042988 A1 | 2/2019 | Brown et al. | |
| 2019/0286620 A1* | 9/2019 | Al-Haimi | G06F 16/211 |
| 2019/0318032 A1* | 10/2019 | Vangala | G06F 16/9024 |
| 2019/0324765 A1* | 10/2019 | Tsai | G06F 16/93 |
| 2020/0057850 A1* | 2/2020 | Kraus | H04L 63/14 |
| 2020/0104726 A1* | 4/2020 | Alvelda, VII | G06N 5/04 |
| 2021/0125253 A1* | 4/2021 | Vega | H04L 67/12 |
| 2021/0133670 A1* | 5/2021 | Cella | G06N 3/044 |
| 2021/0157312 A1* | 5/2021 | Cella | G01M 13/045 |
| 2021/0182709 A1 | 6/2021 | Manchanda et al. | |
| 2021/0357959 A1* | 11/2021 | Cella | G06N 3/04 |
| 2022/0038332 A1* | 2/2022 | Umakanth | H04L 41/142 |
| 2022/0108262 A1* | 4/2022 | Cella | G05B 17/02 |
| 2022/0147698 A1* | 5/2022 | Revankar | G06F 16/958 |
| 2022/0147702 A1* | 5/2022 | Li | G06N 3/088 |
| 2022/0197246 A1* | 6/2022 | Cella | G02B 26/00 |
| 2023/0019211 A1* | 1/2023 | Wang | G06N 3/0464 |
| 2023/0120318 A1* | 4/2023 | Marinkovich | G06F 16/24552 382/155 |
| 2023/0123322 A1* | 4/2023 | Cella | G06Q 10/067 700/29 |
| 2023/0186054 A1* | 6/2023 | Cricrì | G06N 3/0495 706/26 |
| 2023/0368773 A1* | 11/2023 | Mishra | G06F 3/167 |
| 2024/0143930 A1* | 5/2024 | Brinton | G06F 16/90332 |
| 2024/0144141 A1* | 5/2024 | Cella | G06Q 30/0206 |

OTHER PUBLICATIONS

Chaves Ana Anachaves@UTFPR Edu Br et al; "Chatbots Language Design: The Influence of Language Variation on User Experience with Tourist Assistant Chatbots" ACM Transactions on Computer-Human Interaction, ACM New York NY vol. 29. No. 2; 1 page.

* cited by examiner

METHODS AND SYSTEMS FOR IMPLEMENTING A UNIFIED DATA FORMAT FOR ARTIFICIAL INTELLIGENCE SYSTEMS

CROSS-REFERENCE TO RELATED APPLICATIONS

The present patent application claims the benefit of priority to U.S. Provisional Patent Application No. 63/435,394 filed Dec. 27, 2022, which is incorporated herein by reference in its entirety for all purposes.

TECHNICAL FIELD

This disclosure relates generally to defining unified data types for disparate data; and more specifically to an artificial intelligence system that processes disparate data types into a unified data type for use in interface-specific applications.

BACKGROUND

Knowledge systems operate to provide specific information in response to queries. The systems often use a database of structured data (e.g., relational, etc.) that can be queried using particular syntax. The knowledge of the knowledge system is based on the size the database and how the data is structured (e.g., the ease with which particular data may be identified and provided). Knowledge systems with insufficient quantities of data may not have the data requested by a query. Similarly, poorly structured data may cause the wrong data to be returned, the query to take a long time to execute, or the query to return a null response. Scaling a knowledge system may include receiving or scraping data from additional sources. However, such systems may not be able to process data from disparate data sources (e.g., sources of varying types or interfaces) or disparate data types (e.g., data types that may not conform to the structure of the database managed by the knowledge system).

SUMMARY

Methods are described herein for artificial-intelligence-based formatting of data into interface-specific representations. The methods include receiving, from one or more sources, a dataset including information structured for presentation through one or more interfaces associated with the one or more sources; defining, from the dataset, one or more feature vectors usable to train a machine-learning model; training, using the one or more feature vectors, the machine-learning model to generate output associated with a particular interface type; receiving from a computing device, a query through a first interface, the first interface corresponding to a first interface type; executing the trained machine-learning model using the query and an identification of the first interface type, the machine-learning model generating a response to the query that includes a structure tailored for interfaces of the first interface type; and facilitating a transmission of the response to the query through the first interface.

Systems are described herein for artificial-intelligence-based formatting of data into interface-specific representations. The systems include one or more processors and a non-transitory computer-readable medium storing instructions that, when executed by the one or more processors, cause the one or more processors to perform any of the methods as previously described.

The non-transitory computer-readable media described herein may store instructions which, when executed by one or more processors, cause the one or more processors to perform any of the methods as previously described.

These illustrative examples are mentioned not to limit or define the disclosure, but to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
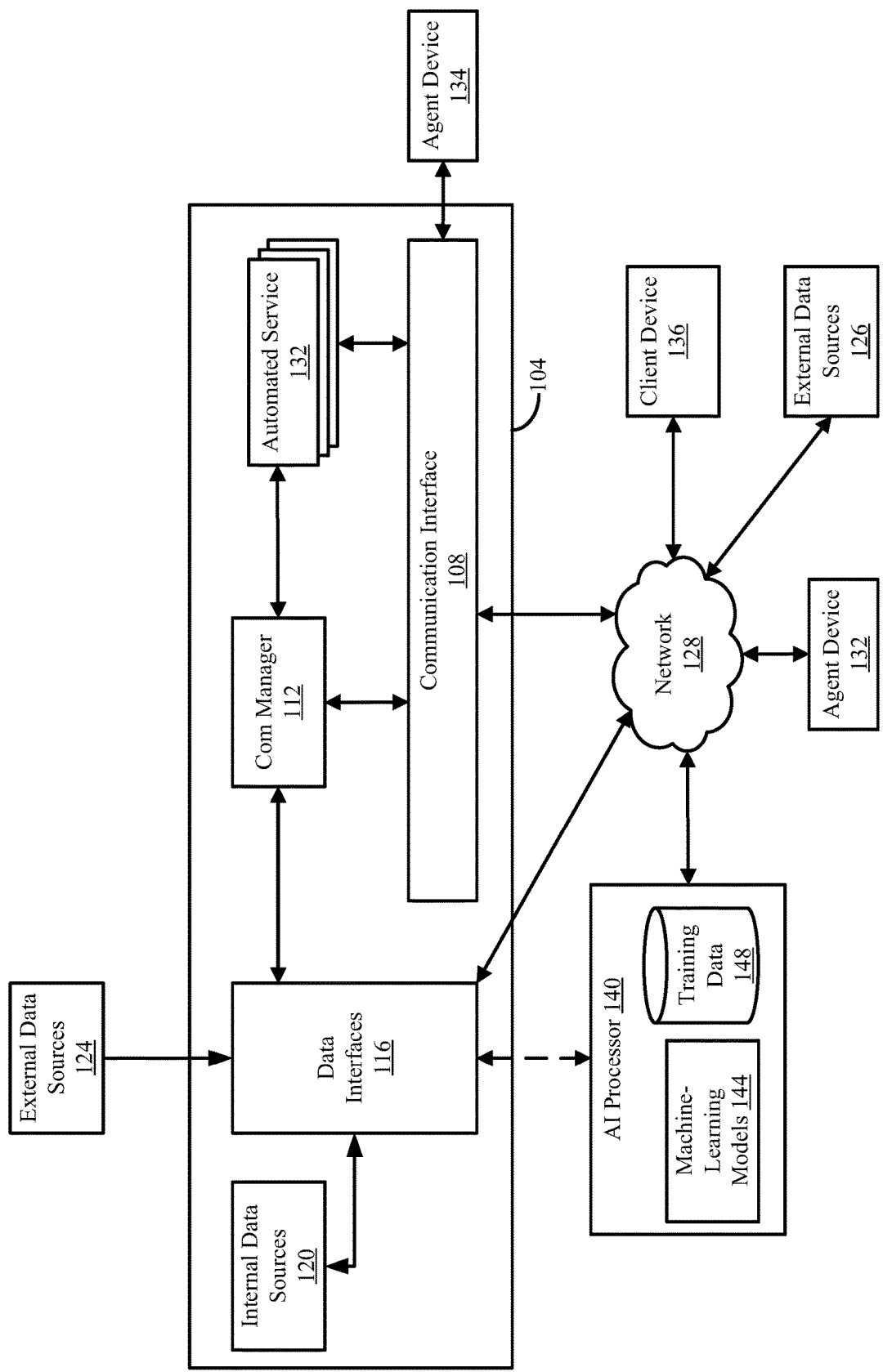
FIG. 1 depicts a block diagram of an example special-purpose data processing system configured to generate and operate on unified data type derived disparate according to aspects of the present disclosure.

Data processing systems may be configured to process incoming data and/or data requests (e.g., queries, etc.) from a variety of disparate sources (e.g., computing devices, mobile devices, servers, databases, cloud networks, websites, client devices and/or the users thereof, agent devices and/or the agents thereof, automated services, and/or the like) formatted according to a variety of disparate data types (e.g., alphanumeric strings, audio segments, video segments, proprietary data structures, etc.). Processing disparate data types in their native formats may strain the processing resources of a data processing systems (e.g., requiring separate resources to process each data type via a distinct workflow, etc.), require semi-manual approaches that may not be feasible as the system scales or the quantity of received data becomes too large, and process data too slowly (e.g., based on the time between receiving a data request and generating the appropriate presentation).

The present disclosure includes systems and methods for artificial-intelligence-based translation of disparate data types into unified data types that can be translated into interface-specific representations. The artificial-intelligence-based data processing system may translate disparate data into a unified data type that is lightweight (e.g., uses less memory than the received data type), can be automatically translated into different data types and/or into any of one or more interface-specific representations, can be translated using machine-learning or non-machine-learning techniques at runtime (e.g., in real-time, etc.), can be processed using fewer processing resources, etc. The unified data type enables the artificial-intelligence-based data to provide natural language representations of the received data tailored to particular interfaces (e.g., telephony, audiovisual interfaces, text messaging, direct messaging, instant messaging, message boards, email, webforms, input/output or machine-based interfaces etc.). For example, the artificial-intelligence-based data processing system may receive a request for data stored as a unified data type through a text messaging interface and generate a natural language response that includes the requested data that conforms to communication standards of text messaging interfaces (e.g., such as, but not limited to, sentence structures, spelling, grammar, abbreviations, etc.). Communication standards may be defined for individual users (e.g., based on the user's historical communications) or for user groups (e.g., based on historical communications of users having one or more common characteristics such as, but not limited to, age, gender, socioeconomic status, interests, location, citizenship, education, employment type, etc.).

The artificial-intelligence data processing may identify (and/or define) interfaces configured to connect to and/or retrieve data from various disparate data sources. The artificial-intelligence data processing system may use one or more machine-learning models to process data form a particular source and/or data of a particular data type to translate the data into a unified data type. For instance, a recurrent neural network (e.g., such as a long-short term memory, etc.) may be trained to identify words from an audio segment and determine the semantic meaning of the identified words. Alternatively, two or more machine-learning models may be used such as a machine-learning model configured to translate the audio segment to alphanumeric text and a second machine-learning model configured to identify a semantic mean of the alphanumeric text. Other machine-learning models may be configured to process other data types. For example, separate machine-learning models may be instantiated and trained to process video data (e.g., image processing, image/object identification, semantic identification, transposition, resolution modification, etc.), image data, formal (orthographic) natural language alphanumeric text, informal natural language alphanumeric text, structured data, unstructured data, sensor data, etc.), and/or the like.

In some instances, data received from a data source (i.e., received data) may be preprocessed by the artificial-intelligence data processing system prior to generating the unified data type that corresponds to the received data. The artificial-intelligence data processing system may preprocess the received data to reduce a quantity of the data being stored, add additional features to the data being stored, add metadata associated with the data being stored, and/or the like. For example, received data associated with a conversation (e.g., audio or a sequence of alphanumeric strings, etc.) may be in a formal orthographic representation of a language that includes superfluous features (e.g., data that does not contributed to the meaning of the conversation, etc.). The artificial-intelligence data processing system may reduce the received data to a minimum form that conveys the meaning of the original data or to form that can be translated into a form that conveys the meaning of the original data. For example, preprocessing may include converting audio segments into alphanumeric strings, parsing alphanumeric strings into word segments (e.g., tokenization), and removing word segments that, while grammatically necessary, do not contribute to the meaning of the data such as articles (e.g., such as 'a', 'an', 'the', etc.), punctuation, etc. The artificial-intelligence data processing system may also normalize word segments (e.g., translating conjugated word segments into a non-conjugated base form, etc.) such as replacing "walking" with "walk", etc.

Alternatively, or additionally, the artificial-intelligence data processing system may classify the received data (e.g., or the reduced form of the received data) as corresponding to one or more semantic categories. Upon determining that the received data corresponds to a particular category, the received data may be replaced with the contents of the category. For example, an input phrase of "our store is open from Monday to Friday" may be classified as "store hours Monday-Friday". The artificial-intelligence data processing system may define a unified data type for the received data that corresponds to "store hours" with one or more additional values corresponding to the numerical representation of the time intervals in which the store is open.

During preprocessing, additional features may be added to the received data to augment the semantic meaning of the data to be stored in the unified data type and/or to provide context usable by the artificial-intelligence data processing system when translating the unified data format into interface-specific representations of the data. The additional data may correspond to features extracted from other portions of the received data, features associated with a source of the received data (e.g., features that correspond to the data source, features that identify the data source, etc.), features associated with a user that generated or is associated with the received data, an identification of a data type of the received data, a timestamp corresponding to when the received data was generated and/or transmitted, and/or the like. Returning to the previous example, the input phrase reduced to "store hours" may be augmented with an identification of the store, a location of the user that generated the received data usable to identify a location of the store, a time interval over which the store hours may be relevant to the user, etc. The artificial-intelligence data processing system may use the additional information to retrieve the operating hours of the store in question.

A unified data type may be a data structure configured to store the semantic representation of discrete portions of received data, the additional features corresponding to the discrete portion of the received data, and/or the metadata the discrete portion of the received data. The structure of the data structure may uniform across uniform data types or may be defined based on the data source, a data type of the data being received (e.g., audio segment, video segment, audiovisual, alphanumeric string, etc.), one or more interfaces for which the artificial-intelligence data processing system is configured to provide data, and/or the like. In some examples, the data structure may include features usable by the artificial-intelligence data processing system and/or other devices to identify particular uniform data types. For example, the data strucuter may be augmented with keywords, hashes, classifications, categories, and/or the like that may be usable to identify particular uniform data types or sets of uniform data types that correspond to the keyword.

The artificial-intelligence data processing system may receive queries for information. The query may be in a structured format (such as, but not limited to structured query language (SQL), etc.), in a natural language format such a question, or any other predetermined format. The query may include metadata usable by the artificial-intelligence data processing system to generate a response. The metadata may include information associated with the user or device that generated the query, an identification of the interface type through which the query was provided, and/or the like. The artificial-intelligence data processing system may process the query to identify one or more uniform data types storing information that may satisfy the query. The artificial-intelligence data processing system may then translate the one or more uniform data types into a natural language representation that is tailored to the interface type identified by the metadata. For example, the artificial-intelligence data processing system may be configured to generate natural language orthographies in which the particular orthography (e.g., the set of conventions for writing a language such as spelling, sentence structure, word breaks, punctuation, etc.) used for an output may be based on the particular interface (e.g., instant messaging, direct messaging, text messaging, webpage, email, verbal such as over a telephone call or video conference, and/or the like) for which the output is to be generated.

In an illustrative example, a computing device (e.g., operating as or including an artificial-intelligence data processing system) may receive a dataset from each of one or more data sources. The information may be received from one or more sources configured to present the information various interface types (e.g., webpages, databases, servers, applications, communication interfaces, etc.). The computing device may actively obtain the dataset (or a portion thereof). For example, the computing device may use a web crawler to retrieve to retrieve information from webpages, one or more application programming interfaces (APIs) to retrieve information from servers or databases, etc. Alternatively, or additionally the dataset (and/or a portion thereof) may be transmitted to the computing device. The computing device may define a set of uniform data types each being configured to store a discrete portion of the dataset in a type-agnostic format that can be automatically translated into a particular data type, a particular data format, a natural language communication, a interface-specific representation, combinations thereof, or the like.

The computing device may define one or more features vectors from historical communications associated with one or more users. The historical communications may include communications transmitted over different interface types. The one or more features vectors may be usable to train a machine-learning model to generate interface-specific representations of data included in the dataset. For instance, the dataset may include data associated with a conversation over an instant messaging communication protocol. The feature vectors derived from the dataset may be usable to train the machine-learning model to generate natural language communications that correspond to the particular orthography of instant messaging communication protocols. The communications may be generated in response to a request for information that may be stored by or accessible to the computing device such as information stored as one or more uniform data types.

The machine learning model may be trained using the one or more feature vectors. The machine-learning model may be trained using unsupervised learning, supervised learning, reinforcement learning, and/or the like over a predetermined quantity of iterations and/or until a predetermined accuracy is reached. The machine-learning model may include, but is not limited to, neural networks (e.g., such as a concurrent, recurrent, etc.), deep learning network, support vector machine, general adversarial network, decision trees, classifier, etc.). For example, in some instance, the machine-learning model may be generative adversarial network that includes two machine-learning models. The first machine-learning model may be configured to generate communications in a particular orthography that corresponds to an interface type and the second machine-learning model may be configured to classify communications from the first machine-learning model as being generated by a human user or an algorithm and/or as conforming to the interface type or another interface type. The results from the second machine-learning model may be used to reinforce the training of the first machine-learning model. The adversarial training within the generative adversarial network may improve the communications generated from the first machine-learning model.

The computing device may then receive a communication from a client device through a first interface. The first interface may be a communication interface such as an instant messaging interface, text messaging interface, telephony interface, email interface, a webform interface, direct communication interface, hardware interface (e.g., such as a network interface, input/output interface, etc.), and/or the like. The first interface may be associated with particular natural language norms (e.g., orthographic, etc.). For example, information may be written in a formal orthography (e.g., proper grammar, spelling, punctuation, etc.) on webpage, while over text messaging, the same information may be conveyed using a less formal orthography (e.g., using little punctuation, additional abbreviations, incomplete sentence structures, emojis, etc.). The computing device may identify whether the communication includes a request for information (e.g., expressly or indirectly). The computing device may also identify the interface type of the first interface to tailor future communications such that the future communications may appear as if generated by a human user rather than the computing device.

The computing device may process the communication to determine one or more possible responses to the request for information. Processing the communication may including translating the communication into a format that can be processed by the computing device (e.g., converting audio to text, preprocessing text, generating a query if not already in a query form, etc.), determining if the communication includes a request that can be satisfied by the computing device, identifying a semantic intent of the communication, and/or the like. The computing device may then execute a query associated with the communication to identify one or more unified data types that may store the requested information.

The computing device may then execute a machine-learning model using the processed communication, the identification of the interface type, the unified data type, user data, and/or the like to generate a natural language response that corresponds to the interface type of the first interface. For example, if the interface type is a text messaging interface, then the machine-learning model may generate a response that includes an orthography defined for text messaging interfaces. The response may be a natural language communication that can be transmitted over the first interface without the user being able to detect that the communication was computer generated (e.g., indistinguishable from other communications transmitted over the first interface).

In some instances, the machine-learning model may be configured to generate communications that are tailored to particular users or user groups in addition to interface types. For example, some users or user groups may use different orthographies when communicating over the interface type than other users or user groups. The machine-learning model may be configured to generate natural language responses that may be tailored to the user (or user group associated with the user) of the client device. When tailoring communication to a particular user or user group in addition to the interface type, the computing device may analyze historical communications of the user or user group (during this communication session or previous communication sessions) to define an orthography usable to generate particularized responses.

The computing device may then facilitate a transmission of the response generated by the machine-learning model through the first interface. In some instances, the client device may be communicating with the computing device through the first interface. In those instances, the computing device may transmit the response through the first interface. In other instances, the client device may be communicating with another device through the computing device. In those instances, the computing device may facilitate the transmission of the response by transmitting the response to the client device through the first interface or causing the other device to transmit the response through the first interface. In still yet other instances, the client device may be communicating with another device and the other device may be in communication with the computing device. In those instances, the other device may then transmit the communication from the client device to the computing device.

The computing device may continue monitoring the communication session analyze a reception of the response (e.g., how the response was received by the user, did the response include the correct information that was requested, did the response appear as if human generated, etc.) and to determine if subsequent responses include subsequent requests for information.

FIG. 1 depicts a block diagram of an example special-purpose data processing system configured to generate and operate on unified data type derived disparate according to aspects of the present disclosure. Special-purpose data processing system 100 may be configured to receive data from disparate data sources and define unified data types that may be usable generate interface-specific communications. The interface-specific communications may be provided to client devices by an agent device, data processing system 104, one or more automated services 132, or the like. Special-purpose data processing system 100 may include a hardware implementation, software implementation, and/or a hybrid hardware and software implementation that may be designed enable efficient high-volume communications between client devices and data processing system 104, client devices and agent devices, and/or the like. Special-purpose data processing system 100 may be designed to improve communication throughput, reduce processing latency through instruction scheduling and/or load balancing, and reduce communication latency with client devices.

Data processing system 104 may include a communication interface configured to manage physical and wireless connections with external devices. In some instances, communication interface may include a set of selectable interfaces that can be enabled upon request. When a device requests a connection with data processing system 104, data processing system 104 may determine a connection type (e.g., wired, wireless, etc.) and characteristics of the requesting device. Data processing system 104 may then enable an interface configured to process input from the requesting device over the connection type. Communication interface 108 may be managed by com manager 112. Com manager 112 may manage communications between client devices and data processing system 104 and between client devices and agent devices. Com manager 112 may provide connection routing (e.g., routing connections to particular agent devices and/or automated services, connection scheduling (e.g., selecting agent devices and/or automated services based on a processing/network load of data processing system 104, on capabilities of the agent devices or automated services, combinations thereof, or the like), information retrieval or predictions via AI processor 140, data formatting (e.g., into a particular interface-specific format, etc.), combinations thereof, or the like.

Data processing system 104 may connect client devices to one or more agent devices and/or automated services 132. The agent devices may be a component of data processing system 104, connected to data processing system 104 directly (e.g., via communication interface 108), or connected to data processing system 104 through a network such as network 128 (e.g., the Internet, a cloud network, local area network, telephone network, cellular network, combinations thereof, or the like). Com manager 112 may select a particular agent device based on the capabilities of the agent device and/or the agent thereof, a processing load of data processing system 104, a network load of data processing system 104, combinations thereof, or the like. For example, client device 136 may connect to data processing system 104 to resolve a query associated a service provider. Data processing system 104 may connect client device 136 to agent device 134 based on the agent associated with agent device 134 having experience with the service provider. Alternatively, or additionally, data processing system 104 may route the connection to agent device 132 based on the current processing load of data processing system 104 regardless of the capabilities of agent device 132. Automated services 132 (e.g., also referred to as a bot, communication bot, etc.) may be configured to communication with client devices via natural language communications. Automated services 132 may be implemented via hardware and/or software. In some instances, an automated service 132 may include one or more machine-learning models trained to process incoming communications and provide natural language responses (e.g., as text, synthetic speech, or video). Com manager 112 may evaluate incoming connection requests to determine whether the intent of the connection request can be resolved by automated services 132 and/or an agent device. Com manager 112 may then route the connection based on the evaluation. In some instances, com manager 112 may give automated services priority over agent devices as data processing system 104 can instantiate any number of automated services.

Data interface 116 includes one or more interfaces configured to processing data from disparate sources. The disparate sources may include internal data sources 120 (e.g., unified data types generated by data processing system 104, historical communications with client devices, machine-learning data, data generated from historical interactions with automated services, internal documents, etc.), external data sources 124 that may be connected directly to data processing system 104 (e.g., databases, etc.), external data sources 126 that may be connected via network 128 (e.g., websites, remote databases, etc.). The one or more interfaces can be selectively enabled to manage any data source. For example, an interface may be enabled for a web crawler to obtain information from one or more webpages and another interface may be enabled for a content management system (CMS) based on the communication protocols of the content management system. In some instances, the one or more interfaces may manage authentication and/or encryption to enable acquiring data from authorized, secured sources (e.g., such as proprietary databases, etc.). Data interface 116 may also manage connections AI processor 140.

AI processor 140 may be a special purpose configured device or set of devices configured to provide machine-learning, automation, load-balancing, and other services to data processing system 104. AI processor 140 may provide services to data processing system 104 as a component of data processing system 104 (not shown), via network 128, or via a direct connection with data interface 116 (e.g., a wired and/or wireless connection to data interface 116). AI processor 140 may include machine-learning models 144 and training data 148 for training machine-learning models 144. AI Processor 140 may also be configured to generate unified data types for data AI processor 140, manage storage and/or retrieval of unified types, process communications, generate and/or automate communications, execute queries for information, generate predictions, translate communications into interface-specific representations, and/or other machine-learning tasks.

In some instances, data processing system 104 may offload execution of instructions, functions, and/or processes to data. Data processing system 104 may offload some processing tasks to AI processor 140 based on a processing load of data processing system 104, the processing tasks to be executed, processing capabilities of data processing system 104, and/or the like. For example, AI processor 140 may include a number of graphical processing units optimized repetitive operations (e.g., such as a machine-learning operations, etc.). Data processing system 104 may determine that a particular processing task may be executed faster and/or more efficiently by AI processor 140 than by data processing system 104 and transfer execution of the particular processing task to AI processor 140. AI processor 140 may then execute the particular processing task and return the result. AI processor 140 and data processing system 104 may each include a scheduling unit configured to schedule execution of tasks, threads, allocation of memory, etc. The scheduling unit of AI processor 140 and the scheduling unit of data processing system 104 may both contribute to the scheduling of processing tasks. Alternatively, the scheduling unit of the data processing system 104 may take priority over the scheduling unit of AI processor 140 such that the scheduling unit of data processing system 104 may control the scheduling of tasks distributed by the data processing system 104 to AI processor 140. Alternatively, the scheduling unit of the AI processor 140 may take priority over the scheduling unit of data processing system 104 such that the scheduling unit of Alternatively, the scheduling unit of the data processing system 104 may take priority over the scheduling unit of AI processor 140 such that the scheduling unit of data processing system 104 may control the scheduling of tasks distributed by the data processing system 104 to AI processor 140 may control the scheduling of tasks distributed by the data processing system 104 to AI processor 140.

AI processor 140 may include one or more graphics processing units with a predetermined quantity of cores configured to modulate processing of machine-learning and non-machine-learning tasks. The hardware architecture of AI processor 140 may be configured to efficiently process machine-learning tasks at the expense of generic processing tasks. In some instances, com manager 112 may be configured to route processing tasks based on the type of processing task to distribute a processing load of data processing system 104. For example, com manager 112 may be configured to route machine-learning tasks to AI processor 140 and non-machine-learning tasks may be processed by processors of data processing system 104. AI processor 140 may transmit output from machine-learning models 144 to data interface 116 to be routed by com manager 112 to automated services 132, agent devices, client device 136, etc. In some instances, AI processor 140 may also transmit accuracy information such as confidence values, prediction probabilities, metadata, etc. that may qualify an output from a machine-learning model.

AI processor 140 may be configured to train machine-learning models, preprocess data from data sources 120-126, post process data output from machine-learning models 144 or from data processing system 104, combinations thereof, or the like. Machine-learning models 144 may be trained by a training subsystem using supervised learning, unsupervised learning, semi-supervised learning, transfer learning, reinforcement learning, combinations thereof, or the like. Machine-learning models 144 may be trained for a predetermined time interval, a predetermined quantity of iterations, and/or until one or more accuracy metrics are reached (e.g., such as, but not limited to, accuracy, precision, area under the curve, logarithmic loss, F1 score, mean absolute error, mean square error, or the like). The training subsystem may monitor signals generated by machine-learning models 144 to determine if a machine-learning model is to be retrained (e.g., reinforcement learning, additional training iterations, etc.) or if a new machine-learning model is to be instantiated and trained. For example, training subsystem may monitor an accuracy metric of a machine-learning model usable to determine when to retrain or replace a machine-learning model.

Examples of machine-learning models include, but are not limited to neural networks (e.g., such as recurrent neural networks, mask recurrent neural networks, convolutional neural networks, faster convolutional neural networks, etc.), deep learning networks, you only look once (YOLO), deep learning networks, Naïve Bayes, random forest, regression models, transformers (e.g., language-based models), k-nearest neighbors, natural-language processors (e.g., speech-to-text models, text-to-speech synthesizers, etc.), decision trees, generative adversarial networks (GANs), combinations thereof, or the like.

In an illustrative example, data processing system 104 may direct AI processor to generate unified data types from one or more data sources (e.g., internal data sources 120, external data sources 124, external sources 126, etc.) that may be stored for later use in automating aspects of communication with client device. Client device 136 may connect to data processing system 104 to query data processing system 104 for information associated with a service provider providing products and/or services. Com manager 112 may determine if the query can be resolved by automated service 132, agent device 132, agent device 134, or by client device 136 and route the connection accordingly. For example, com manager 112 may route the connection to automated service 132 based on the availability of agent devices and the processing load of data processing system 104. Automated service 132 may pass the query to AI processor 140 along with an identification of the communication interface being used by client device 136 (e.g., instant messaging, telephone, email, direct messaging, etc.). AI processor 140 may execute the query against unified data types to generate a query response. AI processor 140 may then translate the query response into an interface-specific response based on the identification of the communication interface being used by client device 136. AI processor 140 may pass the translated query response to automated service 132, which may provide the translated query response to client device 136.

Figure 2:
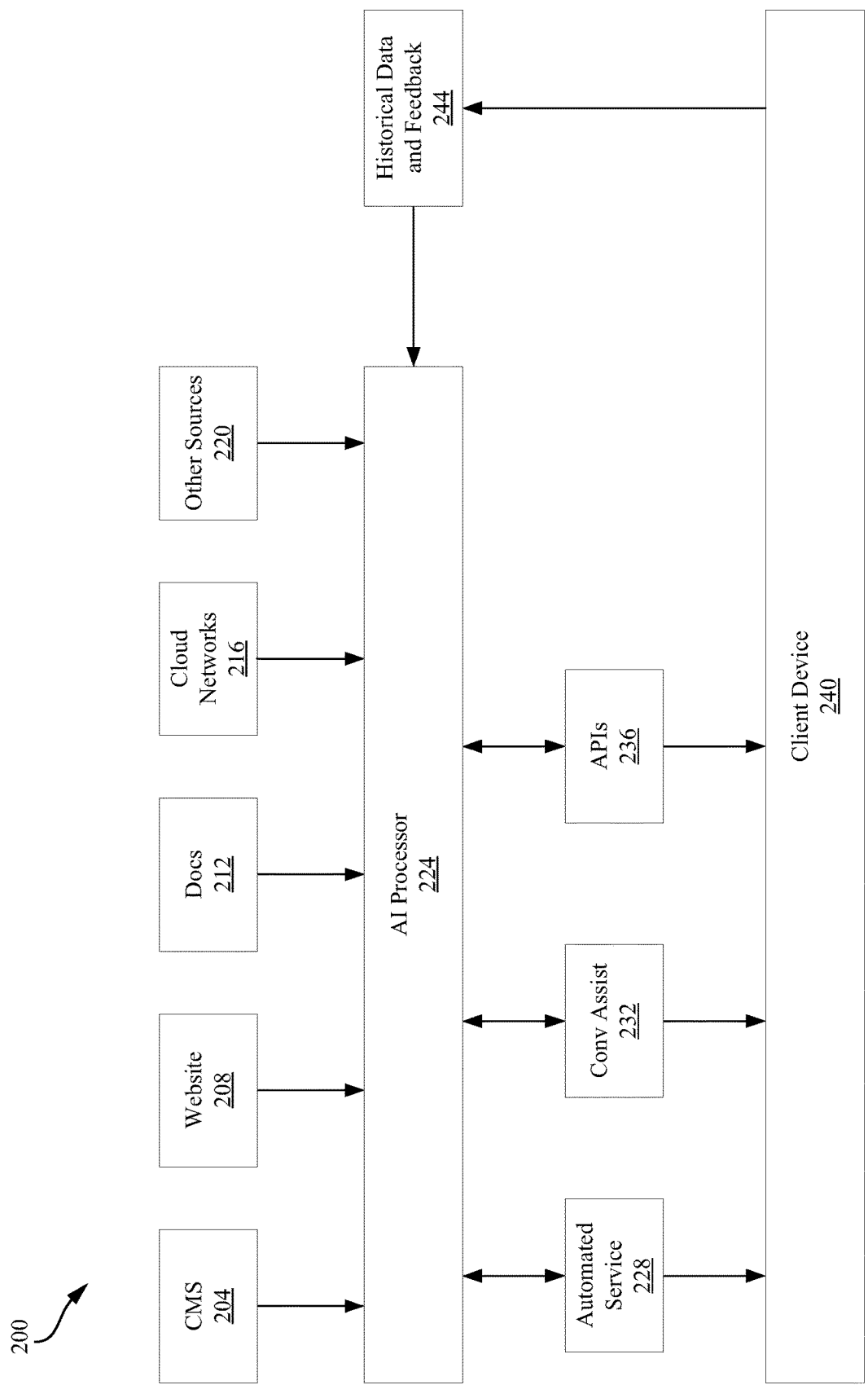
FIG. 2 depicts a block diagram of an example artificial-intelligence data processing system configured to process disparate data types from disparate sources into a unified data type usable to generate interface-specific responses according to aspects of the present disclosure.

FIG. 2 depicts a block diagram of an example artificial-intelligence data processing system configured to process disparate data types from disparate sources into a unified data type usable to generate interface-specific responses according to aspects of the present disclosure. Artificial-intelligence data processing system 200 may receive data from a variety of disparate information sources such as, but not limited to, CMS 204, websites 208, documents 212 (e.g., via a document management system, concurrent versioning system, file system, database, etc.), cloud networks 216, other sources 220 (e.g., analytics services, Internet-of-Things (IoT) devices, databases, servers, any other information source or storage device, etc.), and/or the like.

The manner in which artificial-intelligence data processing system 200 receives data from data sources 204-220 may be based on the data source. For example, some data sources such as IoT devices may transmit a data stream to which artificial-intelligence data processing system 200 may be connected. For some data sources, artificial-intelligence data processing system 200 may transmit a request for particular data and/or for datasets stored by a data source. Artificial-intelligence data processing system 200 may transmit requests in regular intervals (e.g., such as a batch request to one or more data sources, etc.), upon detecting or being notified of new data, and/or the like. For some data sources, artificial-intelligence data processing system 200 may use one or more APIs exposed by the data source to access data from the data source. For some data sources, artificial-intelligence data processing system 200 may instantiate a process configured to scrape data from a data source (e.g., such as web crawler, etc.). The process may execute to access and transmit data of a data source to artificial-intelligence data processing system 200. In some instances, data sources may transmit data to artificial-intelligence data processing system 200 each time new data is generated and/or stored by the data source.

The data of a data source can include any type of information. Some data may correspond to information associated with an object, entity, or topic, that may be requested by a user. Some data sources may store records, documents, files, or the like. For example, a data source may store a record of a conversation (e.g., in an audio format, alphanumeric format, or the like) between a user and an agent. Some data sources may store sensor data from one or more connected sensors (e.g., such as motion sensors, temperature sensors, etc.).

The data from data sources may be received by AI processor 224. AI processor 224 may be configured to process the data into a format usable by one or more conversation services (e.g., automated services 228, conversation assist 232, APIs 236, and/or the like) and/or information-distribution services. AI processor 224 may include one or more devices, processes, machine-learning models, and/or the like configured to process received data into a unified data type. The unified data type may store the semantic information of any received data regardless of the data type of the received data.

AI processor 224 may preprocess the data to convert the received data into one or more general formats from which AI processor 224 may generate the unified data type for the data. AI processor 224 may identify a data type associated with the received data (e.g., based on identifying audio data, video data, alphanumeric strings, a particular file type extension, etc.) and allocate a process and/or machine-learning model capable of processing the identified data type. For example, if the received data includes audio segments, AI processor 224 may allocate a machine-learning model configured to process audio segments into alphanumeric strings (e.g., a speech-to-text translation, audio classification, etc.). For video segments AI processor 224 may allocate machine-learning models configured to classify images, perform object detection, etc. AI processor 224 may then store the preprocessed data in a unified data type.

In some instances, AI processor 224 may augment the unified data type by adding additional features corresponding to contextual information, metadata, etc. to the unified data type. For example, AI processor 224 may identify contextually relevant information based on, but not limited to, information associated with the origin device that transmitted the data and/or the user thereof (e.g., demographic information, location information, an identification of hardware and/or software included within the origin device, an Internet Protocol (IP) address, a media access control address, etc.), information associated with the communication that included the information (e.g., such as an (IP) address, an identification of an origin location of the communication, an identification one or more servers through which the communication traveled, data size, quantity of packets, packet size, etc.), information associated with preceding or subsequently received data, information associated with linked data (e.g., data referenced by the data stored in the unified data type, etc.), and/or the like. AI processor may extract predetermined features from the contextually relevant information. Alternatively, or additionally, AI processor 224 may determine which features to add to the unified data type based on a classification of the data stored by the unified data type (e.g., such as audio or text-based conversation data, video data, information data, etc.).

Unified data types may be assigned one or more identifiers. The identifiers may be used to address particular unified data types, to search for particular unified data types or sets of particular unified data types, and/or the like. In some examples, an identifier of the one or more identifiers may include a reference to a memory address in which the unified data type is stored. The identifier may be generated using a hash of the unified data type or one or more features of the unified data type. Alternatively, once the unified data type is stored, AI processor 224 may identify the memory address and store the memory address in association with the unified data type. Other identifiers may include a description of the data stored by the unified data type, one or more classifications associated with the unified data type (e.g., such as the original data type of the data stored by the unified data type, etc.), a universally unique identifier (UUID) generated for the unified data type, and/or the like.

AI processor 224 may receive requests for information from automated service 228, conversation assist 232, and APIs 236. Automated service 228 may include one or more processes, machine-learning models, and/or devices configured to communicate with users and/or other automated services operating client device 240. Automated service 2298 may communicate with client device 240 using a particular interface. During the communication session, automated service 228 may receive a communication from the user and generate and transmit a response to the user. In some instances, automated services 228 may be configured to communication in a manner such that the user may not detect that automated service 228 is not a human. For example, automated service 228 may be configured to generate responses that are based on a same orthography and/or communication convention (e.g., diction, grammar, slang, abbreviations, etc.) as used by the user. Alternatively, automated service 228 may be configured to generate responses that are based on an orthography and/or communication convention commonly used for the interface type over which the user and automated service 228 are communicating.

Automated service 228 may be configured to communicate over an audio interface (e.g., a telephone call, etc.), a video interface (e.g., video conference, etc.), one or more textual interfaces (e.g., text messaging, instant messaging, email, direct messaging, and/or the like), or the like. Automated service 228 may request information from AI processor 224 during a communication session with a user and/or other automated service. For example, during the communication session, a user may ask a question. Automated service 228 may parse the question to determine a question type, identify information that will resolve the question, an interface type of the interface through which automated service 228 is communicating with the user or other automated service, and/or one or more contextually relevant features that may increase an accuracy of the response that will be generated by automated service 228. Automated service 228 may then execute a query to automated processor 228 for the information.

AI processor 224 may receive the query and identify one or more unified data types that include the requested information. In some instances, AI processor 224 may generate a confidence value for each of the one or more unified data types that include the requested information. The confidence value may be generated based on a degree in which the uniform data type matches the query (e.g., based on a quantity of features of the uniform data type that correspond to the query, or the like). AI processor 224 may then rank the one or more uniform data types and identify a particular uniform data type having a highest confidence value. Alternatively, AI processor 224 may identify a set of uniform data types of the one or more uniform data types having a confidence value greater than a threshold.

AI processor 224 may then translate the particular uniform data type (or the set of uniform data types) into an interface-specific representation based on the interface type identified by the query. For example, if the user is communicating with automated service 228 via a telephonic interface (e.g., voice-based communications, etc.), then AI processor 224 may translate the particular uniform data type into one or more alphanumeric strings that include a conversational representation of the information with a diction, grammar, etc. that is conventional to telephonic communications. AI processor 228 may then translate the one or more alphanumeric strings into a synthetic voice representation that may be presented to the use by automated service 228. Alternatively, AI processor 224 may pass the one or more alphanumeric strings to automated service 228 and automated service may generate the synthetic voice representation of the one or more alphanumeric strings (e.g., using a speech-to-text process, machine-learning model, etc.)

Conversation assist 232 may include one or more processes and/or devices configured to assist a human agent during a communication session between a user and an agent or automated service 228 and an agent. During the communication session, conversation assist 232 may operate in a same manner as automated service 228. For example, conversation assist 232 may analyze received communications from a user or automated service 228 that is communicating with the agent to determine one or more appropriate responses to the received communications. Conversation assist 224 may transmit queries to AI processor 224 for information needed to generate particular responses (in a same or similar manner as previously described). AI processor 224 may identify the unified data types storing the information and translate the information into a format native to the communication interface of the communication session. When a response is defined, conversation assist 232 may present the response to the agent as a suggested response. The response may include a simplified response such as a shorthand that can be translated by the agent into a formal conversational response (e.g., including a particular sentence structure, wording/phrasing, grammar, punctuation, etc. that is native to the communication interface being used). Alternatively, the response may be presented as a formal conversation response. The agent may select from among one or more suggest responses to present the response to the user or automated service 228 or present a response defined by the agent. The response may be presented as if the response was generated by the agent (e.g., the agent may speak the response or the response may be written out as if from the agent, etc.).

In instances in which multiple responses are generated, conversation assist 232 may rank or score each response so as to provide the agent with options that may be selectively presented over the communication session. The rank or scores may be based on one or more algorithms configured to maximize a probability that particular event will occur (e.g., such as resolving a user issue or complaint, providing a response to a query, causing the user to sign up for a service, causing the user to generate a new profile, cause the user purchase an item, etc.). A score may include a probability value corresponding to the probability that a particular event may occur if a particular response is selected, an indication in which the probability value will change if a particular response is selected, etc.

APIs 236 may include a set of interfaces exposed to client device 240 and/or other devices authorized to access AI processor 224. The set of interfaces may allow client device 240 to directly query AI processor 224 for information stored in a unified data type. The APIs may be wrapped within an application configured to execute functions of the APIs. Alternatively, the application may connect to APIs 236 or execute remote calls to the functions of APIs 236. The application may include graphical user interfaces and/or command line interfaces that enable client device 240 to selectively execute the functions of APIs 236. APIs 236 may include one or more APIs accessible via different interface types usably by client device 240.

For example, client device 240 may be a desktop computer executing an application through which client device 240 may access AI processor 224. The application may access one or more of the APIs of APIs 236 that correspond to desktop computers. AI processor 224 may receive a query and identify the APIs used to generate the query to determine an interface type usable by the application. AI processor 224 may then generate a response and translate the response into a format usable by the interface type of the application.

Other devices and/or processes configured to access AI processor 224 may utilize other interface types (e.g., such mobile interfaces usable by mobile devices, web interfaces, thin client interfaces, audio-only interfaces such as telephones or smartphones, video only interfaces, audiovisual interfaces, etc.). APIs 236 may include APIs configured to translate requests from client device 240 (in any particular format or using any particular interface type) into a request processable by AI processor 224 (e.g., in a particular format and/or using a particular interface of AI processor 224). APIs 236 may be configured to translate response from AI processor 224 into a format and/or using the particular interface type of client device 240. For example, if client device 240 is a telephone, then queries from client device 240 may be in an audio-only format. APIs 236 may convert the audio into text and convert the text into a particular alphanumeric-string format parsable by AI processor 224. AI processor 224 may generate a response in an alphanumeric-string format and APIs 236 may convert the response in the alphanumeric-string format to an audio format that can be received by a telephone.

Client device 240 may generate one or more metrics corresponding to the communication session between automated service 228 and the user, automated service 228 and another automated service 228, an agent operating conversation assist 232 and the user or automated service 228, the user and AI processor 224 via APIs 236, and/or any other communications of a service involving AI processor 224 or unified data types The one or more metrics may be manually generated (e.g., by a user, agent, or the like) and/or automatically generated (e.g., by an communication application, automated service 228, conversation assist 232, APIs 236, AI processor 224, etc.) based on the occurrence of events during the communication session, an analysis of the communications transmitted and/or received, a satisfaction of the user, etc. For example, the one or more metrics may include an indication of an accuracy of a response to a communication transmitted by the user (e.g., indicating the degree with which AI processor 224 identified the correct information), the degree in which communications conformed to the interface type used for the communication session (e.g., indicate whether communications used an appropriate conversational standard of the interface type), and/or the like. The one or more metrics may be transmitted to historical data and feedback 244.

Historical data and feedback 244 may store records of communication sessions (e.g., the one or more metrics, communications transmitted to and/or received by client device 240, feedback from the user, feedback from the agent, feedback from the automated service 236, and/or the like). Historical data and feedback 244 may use the records of one or more communication sessions to define one or more feature vectors usable to train the machine-learning models of AI processor 224. The feature vectors may be used to train new machine-learning models based on the historical communications and (in the case of supervised learning) the one or more metrics and/or feedback generated from those communications. Machine-learning models may be trained for predetermined time interval, for a predetermined quantity of iterations, until a predetermined accuracy is reached, and/or the like. The one or more metrics and/or feedback may be used to determine an on-going quality (e.g., accuracy, precision, area under the curve, logarithmic loss, F1 score, mean absolute error, mean square error, etc.) of the output of the machine-learning models. If the one or more metrics and/or feedback indicate that the quality of the machine-learning model is below a threshold, then historical data and feedback 244 may retrain the machine-learning model, instantiate and train a new machine-learning model, and/or the like.

In some instances, the feature vectors may be used for reinforcement learning and/or other types of on-going learning. In those instances, a trained machine-learning model used during a communication session to generate a response (e.g., by translating a uniform data type into a conversational response native to a particular interface type), may execute a reinforcement-learning iteration using the feature vector used to generate the response, the one or more metrics, and one or more thresholds to qualify the one or more metrics. The reinforcement-learning iteration may adjust internal weights of the machine-learning model to bias the machine-learning model towards or away from generating particular responses. If the one or more metrics associated with a response are high relative to the one or more thresholds (e.g., indicating the response generate good or accurate results), then reinforcement learning may bias the machine-learning model to generate responses similar to this response. If the one or more metrics associated with a response are low relative to the one or more thresholds (e.g., indicating the response generated poor or inaccurate results), then reinforcement learning may bias the machine-learning model to generate responses different from this response.

Figure 3:
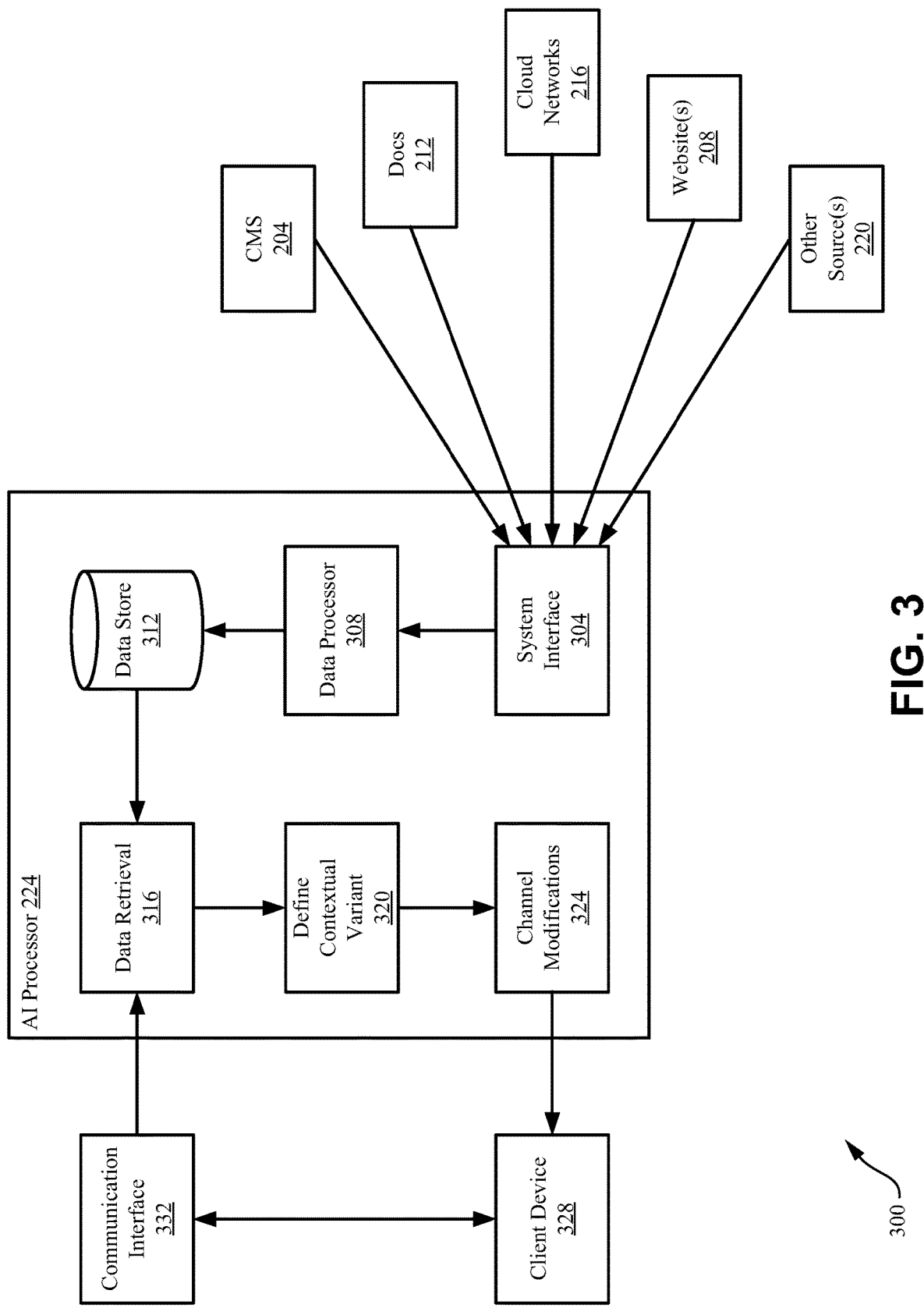
FIG. 3 depicts a block diagram of an example artificial-intelligence data processing system configured to process disparate data types from disparate sources into a unified data type according to aspects of the present disclosure.

FIG. 3 depicts a block diagram of an example artificial-intelligence data processing system configured to process disparate data types from disparate sources into a unified data type according to aspects of the present disclosure. AI processor 224 may include system interface 304 configured to receive information from one or more remote sources. For example, system interface 304 may include one or more interfaces, machine-learning models, processes, and/or APIs configured to receive, request, and/or obtain information from one or more of CMS 204, documents 212, cloud networks 216, websites 208, other sources 220 (e.g., databases, servers, client devices, networks, etc.), and/or the like. Some sources may transmit the information in a single transmission, batch transmission, a continuous stream, and/or the like, which may be received via system interface 304. Some sources may, upon receiving a request for particular information or datasets (e.g., via an API or remote procedural call, communication request, etc.), transmit the requested information or datasets. System interface 304 may execute one or more machine-learning models and/or other processes to gather information from publically and/or privately available sources. For example, a webcrawler (e.g., including the one or more machine-learning models and/or other processes) may execute to automatically gather information posted on webpages. The webcrawler may be configured to gather particular types of information, visit particular types of websites, visit websites of a particular domain or webhost, visit all websites, etc.

The information may be passed to data processor 308, which may generate unified data types configured to store the information in a neutral format (e.g., a format configured to store raw information regardless of the data type of the received data). Data processor 308 may include one or more machine-learning models trained to process particular data types. Data processor 308 may, for each discrete portion of information received, identify a data type of the information (e.g., audio, video, audiovisual, alphanumeric strings such as text, numerical or mathematical data, complex data structures such as tabular data, etc.). Data processor 308 may then determine a process and/or machine-learning model configured to translate the data type. Some data types may not need to be process or may need minimal processing (e.g., such as strings or numerical data) as the unified data type may be configured to store alphanumeric strings and/or numerical data directly. For example, a machine-learning model (e.g., such as a neural network, recurrent neural network, deep learning network, classifier, and/or the like) may be trained to convert audio to alphanumeric strings. Another machine-learning model (e.g., such as a neural network, concurrent neural network, deep learning network, classifier, and/or the like) may be trained to identify the content presented by video (e.g., frame by frame or by sets of frames, etc.) and/or classify the video to a particular category, etc. Another machine-learning model may be trained process tabular and/or complex data structures into a neural format (e.g., such as alphanumeric strings, comma separated variable, and/or any other structured representation).

In some instances, data processor 308 may further refine alphanumeric strings (or neutrally formatted data) into a neural representation of the data. Unified data types may be used to generate conversational representations native to a variety of interface types (e.g., telephonic, video conference, video, text messaging, direct messaging, instant messaging, email, etc.). A native representation may include a representation of data that includes an orthography (for written communications) or communication conventions (for other communications) that may socially common or acceptable over a particular communication interface. For example, a native representation of text over text messaging may include incomplete sentences, little no punctuation, non-dictionary-recognized abbreviations, etc., while a native representation of text over email may include complete sentences in a formal orthography (e.g., formal grammar, sentence structure, spelling, etc.). The neutral representation of the data may be defined based on an ability to translate the neutral representation in any of one or more representations native to a particular interface type. In some instances, the neutral representation may include removing superfluous words and or characters from alphanumeric strings (e.g., articles such as 'a' or 'the', punctuation, etc.), removing words that may not contribute to a meaning of the data, replacing conjugated verbs with non-conjugated verbs, replacing words with categorical representation of the words (e.g., word representing a class of words with similar meanings, etc.), and/or the like.

The unified data types may be stored in data store 312. Data store 312 may include one or more local and/or remote memories. In some instances, data store 312 may be a distributed memory system of a local or cloud network. Each unified data type may be stored in association with an identifier (e.g., usable to identify a particular unified data type from other unified data types), which may be a representation of the data of a unified data type, memory location of data store 312, one or more features of the unified data type, and/or the like. Each unified data type may be stored in association with one or more keywords usable to identify sets of unified data types that correspond to a same or similar context, semantics, type, classification, and/or the like.

Data retrieval 316 may include processes for retrieving unified data types from data store 312. Data retrieval 216 may receive a query and execute the query against data store 312 to identify particular unified data types or sets of unified data types. The query may be received during a communication session between a user and an agent, a user and another user, a user and an automated service, and/or the like via communication interface 332. In some instances, the query may also be received directly from client device 328, an agent device (not shown), a device executing automated service, and/or the like. The query may be expressly defined (e.g., a question, Boolean expression, etc.) or inferred from a context or the semantics of one or more discrete communications.

The query may include a search string identifying one or more unified data types, an identification of an interface type of the interface, a context of the query (e.g., derived from communications transmitted during the communication session, information associated with the parties of the communication session such as demographic information and/or historical chat histories, etc.), and/or the like. The search string may be in a format that can be automatically executed by data retrieval 316. Alternatively, data retrieval 316 may generate a version of the search string that can be executed. In some examples, data retrieval 316 may include a search engine (e.g., via a command line interface, graphical user interface, or other interface) through which a user may search for unified data types. The search engine may accept identifiers, keywords, Boolean operators (e.g., "and", "or", "not", etc.), and/or the like and an identification of an interface type. The search engine may be used to identify particular unified data types or a set of unified data types.

Data retrieval 316 may pass the retrieved unified data types and the identified interface type to define contextual variant 320. Define contextual variant 320 may translate the unified data type into one or more conversational response that include natural language communications. The one or more conversational responses may include contextual variations defined based on a context of the query and/or the communication session so as to provide different conversational responses conveying the information of the unified data type in different ways (e.g., varying the tone, sentence structures, diction, grammar, etc.). AI processor 224, the agent, and/or the automated service communicating with the user may select the contextual variation of the conversational response that may best convey the requested information, that may seamlessly fit into the communication session without appearing automatically generated or otherwise not generated by a human, etc.).

In some instances, the contextual variants of the conversational response may also include variation to the conversational response that account for other information of the communication session. For example, the user may ask for information associated with a store that may have multiple locations. Define contextual variant 320 may define contextual variations based on the store hours of particular locations that may be relevant to the user or the context of the user (e.g., such as the store located closes to the user, the store located closest to the user's home, etc.). Define contextual variants 320 may be generated using one or more machine-learning models (e.g., neural networks, generative adversarial networks, deep learning networks, recurrent neural networks, classifiers, and/or the like) trained using historical communication sessions and queries to define conversational representations of unified data types.

Channel modifications 324 may receive the contextual variations and an identification of the interface type of the interface of the communication session and generate a conversational response tailored to interfaces of the interface type. In some instances, a conversational response may be generated for each contextual variation. In other instances, a contextual variation may be selected from among the multiple contextual variations (e.g., based on a score assigned to each contextual variation, user input, etc.). The conversational response may be generated to conform to a particular orthograph that conforms to social norms and/or user preferences associated with communications transmitted over interfaces of the interface type.

For example, channel modifications 324 may generate a response for a text-messaging interface type that includes an informal orthography (e.g., including abbreviation, spelling, sentence structure, diction, grammar, punctuation, etc.) that conforms to the social norms of communications over text messaging. Channel modifications 324 may generate a response for an email interface type that includes a formal orthography (e.g., including abbreviation, spelling, sentence structure, diction, grammar, punctuation, etc. common to email messaging communications) that conforms to the social norms of communications over email. Multiple orthographies may be defined for email interface types based on a context of the communication session. For instance, a corporate communication session over an email interface may use a formal orthography while a customer-service communication session over an email interface may use a less formal orthography (though still more formal than the informal orthography over a text messaging interface).

The orthography may be defined based on historical communications transmitted over interfaces of the interface type. In some instances, the orthography may be defined based on a selection of communications transmitted over interfaces of the interface type. In other instances, the orthography may be defined based on communications transmitted by the user over interfaces of the interface type. In those instances, the conversational response may be tailored to both the user and the interface type.

Although orthographies generally refer to the conventions of written communications (e.g., sentence structure, grammar, spelling, diction, punctuation, abbreviations, etc.), orthographies may also apply to oral communications (e.g., via telephone or video conference) and/or video communications (e.g., sign language, other gesture-based communications, symbolic communications, etc.). In those instances, channel modifications 324 may define an oral orthography by translating historical oral communication session (e.g., telephone, video conference, etc.) into alphanumeric strings. Channel modifications 324 may generate the conversational response according to the oral orthography and translate conversational response to speech (e.g., using a text-to-speech algorithm or machine-learning model. Similarly, video communications may be translated to text using one or more machine-learning models (such as convolutional neural networks, etc.) to define a visual orthography.

Channel modifications 324 may include one or more machine-learning models trained to define orthographies and/or use defined orthographies to generate conversational responses native to particular interface types. The one or more machine-learning models may include, but are not limited to neural networks, generative adversarial networks, deep learning networks, recurrent neural networks, classifiers, and/or the like. The machine-learning models may be trained using historical communications of a particular user configured to tailor conversational responses and other communication to a form and in a format used by the user when communicating over a particular interface type. Alternatively, or additionally, the machine-learning models may be trained using historical communications associated with multiple users communicating over interfaces of the interface type.

In one illustrative example, channel modifications 324 may use a generative adversarial network to generate a conversational response tailored to an interface of the interface type. If the interface type is text-based, channel modifications 324 may then output the conversational response to client device 328 via the interface. If the interface type is audio-based (e.g., telephone, etc.), channel modifications 324 may include a text-to-speech machine-learning model configured to translate the conversational response into an oral response that may be presented to client device 328 via a synthetic voice. If the interface type is visual (e.g., images, video, etc.), channel modifications 324 may include another generative adversarial network configured to generate a visual representation of the conversational response (e.g., such as images or video of symbols, words, sign language, gestures, etc.). Other machine-learning models may be included to translate the conversational response into other representations that may be particular to an interface type.

Client device 328 may receive the conversational response over the interface. The conversational response may appear as if generated by a human and/or use an orthography commonly used for interfaces of the interface type. Client device 328 may then transmit additional communications in response to receiving the conversational response. The additional communications may advance the conversation between the user and automated service, the user and the agent, etc.

In some instances, the additional communications may be used to infer one or more metrics indicative of an accuracy of conversational response. The one or more metric may include metrics associated with the data retrieved by data retrieval 316 (e.g., did data retrieval 316 identify a correct unified data type, etc.), metrics associated with the contextual variants generated by contextual variant 320 (e.g., does the define contextual variant fit the context of the communication session and/or characteristics of the user, etc.), metrics associated with the conversational response generated by channel modifications 324 (e.g., does the conversational response generated by channel modifications 324 correspond to the orthographic norms of the interface type, etc.). Alternatively, or additionally, the user, automated service, and/or the agent may provide the one or more metrics for data retrieval 316, define contextual variant 320, and channel modifications 324.

The one or more metrics may be used to further train data retrieval 316, define contextual variant 320, and channel modifications 324 to improve query execution and accuracy, contextual variations, and the tailoring the conversational responses for particular interface types. For example, one or more feature vectors based on the particular component and/or machine-learning model being trained (e.g., data retrieval 316, define contextual variant 320, channel modification 324, and/or any machine-learning models thereof). The one or more feature vectors may include the one or more metrics, the input corresponding to the one or more metrics (e.g., into the component or machine-learning model that resulted in a conversational response used to generate the one or more metrics), the output (e.g., the output from data retrieval 316, define contextual variant 320, and/or channel modifications 324, etc.), any intermedia output (e.g., the output from data receival 316, define contextual variant 320, or channel modifications 324), and/or the like. The one or more feature vectors may be used to execute a training iteration for machine-learning models, train new machine-learning models, perform a reinforcement learning iteration, and/or the like. The training iteration may be used to improve subsequent outputs from data retrieval 316, define contextual variant 320, and/or channel modifications 324, reinforce a particular result, train new machine-learning models that may be better able to perform any of the functionality of data retrieval 316, define contextual variant 320, and/or channel modifications 324, and/or the like.

Figure 4:
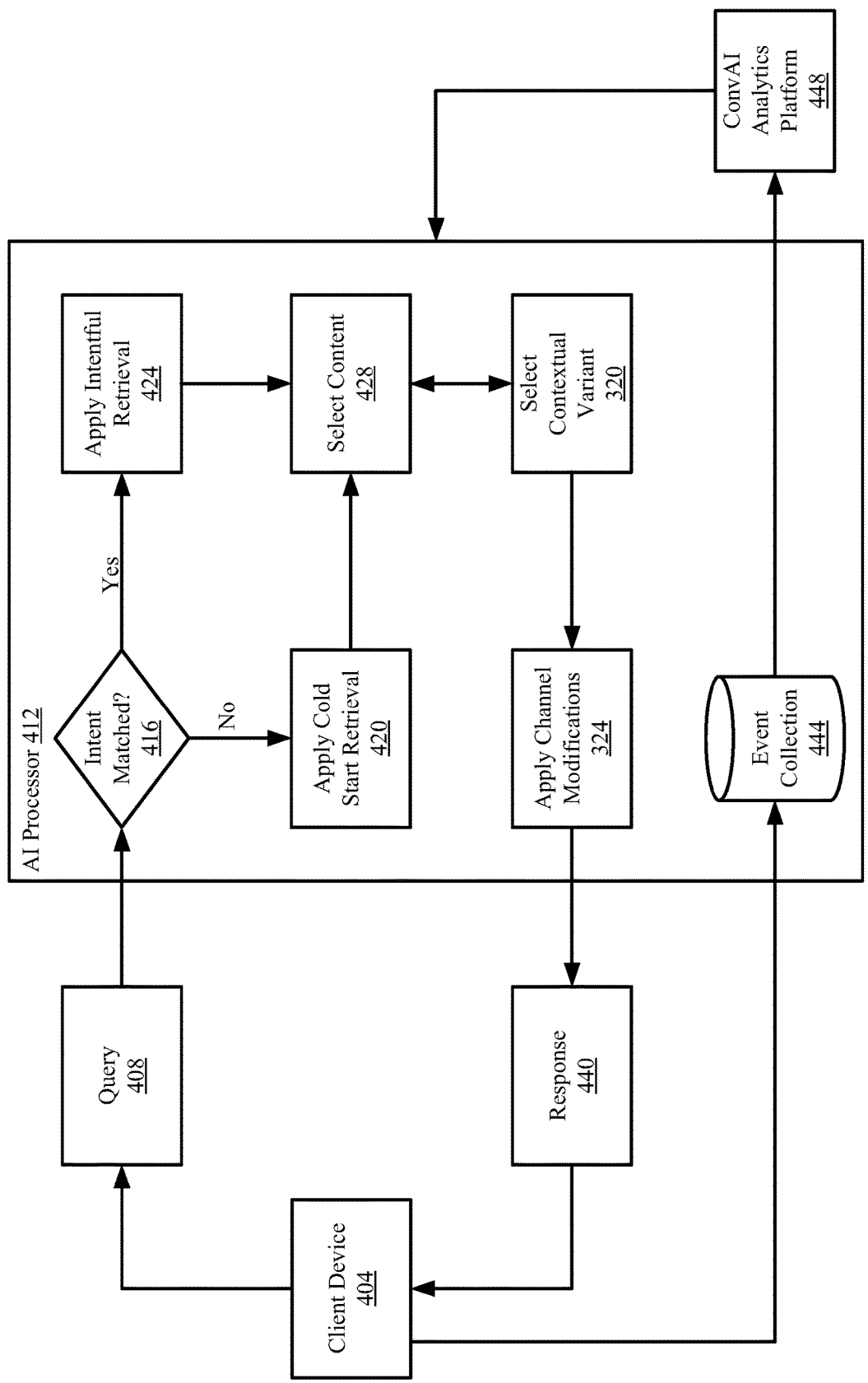
FIG. 4 depicts a block diagram of an example artificial-intelligence data processing system configured to generate query responses that translate unified data types into interface-specific representations according to aspects of the present disclosure.

FIG. 4 depicts a block diagram of an example artificial-intelligence data processing system configured to generate query responses that translate unified data types into interface-specific representations according to aspects of the present disclosure. Artificial-intelligence data processing system 400 may process queries that are expressly defined or inferred from communications transmitted by client device 404 (e.g., a computing device, mobile device, telephone, etc.) during a communication session. For example, client device 404 may generate query 404 as a question or a structured request for data (e.g., in a particular format or using a particular syntax, etc.). Alternatively, query 408 may be generated based on analysis of communications transmitted by client device 404 during a communication session with an agent or automated service. The communication session may include an instance in which client device 404 is communicating with another client device operated by an (human) agent, with an automated service (e.g., software and/or hardware configured to communicate via natural language with human users or other automated services), with AI processor 412, and/or the like. The communication session may be facilitated over an interface of a particular type (e.g., telephonic, video conference, instant messaging, text messaging, email, etc.) and/or a particular communication protocol.

In some instances, artificial-intelligence data processing system 400 may include a machine-learning model configured to predict the likelihood that a particular communication includes a request for information or that a particular communication may be associated with additional information that can be provided to client device 404. If the predicted likelihood is greater than a threshold, then artificial-intelligence data processing system 400 may convert the communication into query 408 (e.g., as a structured request for data) using an algorithm, the machine-learning model (e.g., classifying the communication as corresponding to one or more template queries that can be modified using particular features of the communication), another machine-learning model, etc.

Query 408 may include an identification information requested, an interface type corresponding to the communication session, features extracted from the communication session and/or communications transmitted over the communication session (e.g., such as those that may be associated with the query, those that may provide limits on the query, etc.), user input (e.g., from the user, the agent, etc.), and/or the like.

Query 408 may be passed to AI processor 412, which, at 416 may determine an intent associated with the query. An intent associated with the query may correspond to the particular information intended to be retrieved by client device 404 and/or a particular format in which the requested information is to be presented. For example, a user may transmit a query of "what are the store's operating hours?". The query may be applied to any store and for stores that may have more than one location, any of the locations for the store. AI processor 412 may classify the intent of the query as the operating hours of a particular store and/or at a particular location (e.g., such as the store that is closest to the user's current location or home, etc.). AI processor 412 may determine an intent of the query using one or more machine-learning models to classify the query as corresponding to one or more predetermine intents. The one or more machine-learning models may use, as input, a feature vector that includes and/or is derived from the query, information associated with the user (demographic information, location information, historical interactions with AI processor 412, historical interactions with the agent and/or automated service, etc.), and information associated with other communications transmitted during the information session (e.g., emotional state of the user, communications transmitted and/or received during the communication session, user's inferred or stated intent when connecting to the communication session, etc.), and/or the like. Alternatively, or additional, the agent and/or automated service may determine an intent of a query. In those instances, the intent may be based on the query and/or inferred from communications transmitted during the communication session.

If the intent cannot be determined (or an identified intent does not match a predefined intent) at 416, then AI processor 412 may apply a cold start retrieval (320), which may process the query in isolation (e.g., without the benefit of the additional contextual information such as the intent and/or other information of the communication session, etc.). AI processor 412 define an internal query for the information requested by translating query 408 into a format that can be executed by AI processor 412 against a database of information. Alternatively, if query 408 is already in a format that can be executed by AI processor 412 against the database of information, then query 408 may be executed without defining the internal query. AI processor 412 may continue the process at select content 424 where the internal query may be executed to obtain the information requested by the query.

If the intent is matched 416, AI processor 412 may apply intentful retrieval 424 of the information request by the query. Intentful retrieval 424 may include defining an internal query that includes the user's query 408, the matched intent (and any feature extracted from the query and/or communication session associated therewith), and/or any features that may be extracted from the query and/or communication session. Alternatively, if query 408 is already in a format that can be executed by AI processor 412 against the database of information, then query 408 may be executed without first defining the internal query.

Select content 428 may include executing the internal query (or query 408 if already in an executable format) against the database of information. The database of information may include data stored as unified data types. Executing the internal query may return one or more unified data types. A unified data type may store data in type-neutral representation. A unified data type is configured to be translated into any particular data type associated with a particular interface type using one or more machine-learning models of AI processor 412 (e.g., generative adversarial networks configured to generate text, audio, images, and/or video; speech-to-text models; text-to-speech models; object detection; classifiers, etc.). The internal query or query 408 may be executed against the unified data types in the database to identify one or more unified date types storing the requested information.

AI processor 412 may define one or more conversational responses that include natural language statements conveying the information retrieved from the database. Select contextual variants 320 may define one or more conversational responses based on the context of the communication session (e.g., communications transmitted and/or received, an identification of the interface type, an identification of the user and/or information associated with the user, an identification of the automated service if connected to the communication session or interface, an identification of agent if connected to the communication session or interface, the query, and/or the like. The one or more conversational responses may include variations to the tone, structure, grammar, diction, etc. so as to convey a same or similar meaning in different ways. In some instances, the one or more conversational responses may include variations based on additional features extracted from the communication session (e.g., such location information, user preferences, and/or the like). For example, a query requesting information associated with a store having multiple locations may result in one or more conversational responses that vary according to the location of the store. Each conversational response may be based on a different store of the multiple locations.

Select contextual variant 320 may then select the conversational response that may best fit the communication session based on a score assigned to each conversational response, user input, a machine-learning model, and/or the like. For example, scores may be assigned to each conversational response based on a prediction (e.g., by a machine-learning model, algorithm, or the like) indicative of a likelihood that the conversational response will appear as if authored by a human.

Apply channel modifications 324 may translate the selected conversational response to a conversational response that is tailored to a particular interface type of the communication session. AI processor 412 may define an orthography for each interface type. The orthography may be defined based on previous communications transmitted over interfaces of the interface type. In some instances, the orthography may be defined based on historical communications generated and/or transmitted by the user of interfaces of the interface type. The orthography may be usable by apply channel modifications 324 to generate a communication from the selected contextual variant that conforms to the social norms and/or limitations of the interface type (e.g., communication length, bandwidth, etc.). The response may be generated so as to appear as if generated by a human agent.

The generated response may be output by AI processor 412 as response 440 to client device 404 over the interface of the communication session. Response 440 may appear as if generated by the agent and/or automated service with which the user is communicating. Alternatively, the generated response may be provided via a conversational assist to an agent (e.g., operating an agent device such as, but not limited to, a computing device, mobile device, telephone, etc.) as a suggested response. The agent may then determine whether to transmit the generated response, modify the generated response, transmit an alternative response, request an alternative response from the conversational assist or AI processor 412, and/or the like over the communication channel with client device 404.

Client device 404, AI processor 412, an automated service or agent communication via the communication channel with client device 404, and/or the like may generate feedback associated with query 408 and/or response 440. The feedback may indicate quality, accuracy, etc. of response 440 given query 404. In some instances, the feedback may include information expressly requested (e.g., via a survey question, or the like), information determined from subsequent communications transmitted by the user (e.g., interpreted to infer what the user thought of the response 440 such as whether the response included the requested information, the quality of response 440, the helpfulness of response 440, the form or format of response 440, the delivery of response 440, etc.), and/or the like.

In addition to the feedback, AI processor 412 may detect and store events associated with the communication session. The events may be stored in event collection 444. Events may include an identification of occurrences that may be associated with the communication session, query 408, and/or response 440 (e.g., such as purchasing a product, interacting with a particular webpage, downloading an application or content, connecting to a particular communication channel, disconnecting from the current communication channel, etc.), and/or the like. For example, query 408 may correspond to a request for information related to a product provided by a webpage. AI processor 412 may generate response 440 with the requested information. AI processor 412 may then detect that client device 404 interacted with the webpage to purchase the product. AI processor 412 may generate a purchase event record associated with the communication session and store the event in event collection 440. Alternatively, AU processor 412 may receive the purchase event record from the webpage, from client device 404, and/or the like.

The events and/or feedback may be passed to convAI analytics platform 448. ConvAI analytics platform 448 may be configured to generate analytics, reports, feature vectors, etc. corresponding to the communication session, individual query and responses, client device 404 and/or the user thereof, an agent device and/or the agent thereof, an automated service, AI processor 412, and/or the like. In some instances, convAI analytics platform 448 may be indicative of an accuracy of responses generated by AI processor 412, how well responses generated by AI processor 412 are received by users, how effective are the responses generated by AI process 412 at appearing human generated and/or tailored to particular interface types, etc. In some instances, convAI analytics platform 448 may generate feature vectors based on communication session usable by AI processor 412 to train particular machine-learning models, perform training iterations (e.g., for reinforcement learning or other iterative learning algorithms), and/or the like. In those instances, convAI analytics platform 448 may generate feature vectors in regular time intervals (e.g., based on a predetermined learning algorithm, etc.), upon detecting a particular event (e.g., such as a positive termination of the communication session, an indication that the user purchased a product associated with query 404 or response 440, etc.), receiving positive and/or negative feedback, and/or the like.

For example, a score may be assigned to each response 440 (e.g., based on the feedback, any detected events, etc.) indicative of a positive or negative reception by the user. ConvAI analytics platform 448 may generate a feature vector based on responses 440 having a score that is greater than a first threshold (e.g., indicative of a good response 440) or less than a second threshold (e.g., indicative of a bad response 440 such as, but not limited to including inaccurate information, including the wrong information or information not requested by query 404, having a wrong orthography for the interface type, appearing as if not generated by a human, etc.). The thresholds may be defined such that feature vectors may be generated when a sufficiently bad response 440 is generated (to improve the machine-learning models and prevent subsequent bad responses) and when a sufficiently good response 404 is generated (e.g., to reinforce such responses). The feature vectors may be generated based on the portion response 440 that was considered a good response or bad response so as to generate feature vectors configured to improve the machine-learning model that resulted in the good or bad response. For example, a bad response 440 that had the correct information, but an orthography insufficiently tailored to the interface type, may result in a feature vector tailored the machine-learning models of apply channel modifications 324, which defined the orthography for that response.

AI processor 412 may provide responses 440 to individual queries 408 or to communications transmitted over the communication session. Each response 440 may be evaluated by convAI analytics platform 448 to determine whether AI processor 408 can learn from the response 440 and/or any related feedback, events, or analytics to improve responses generated by AI processor 412. ConvAI analytics platform 448 may facilitate a training iteration zero, once, more than once, and/or continuously during the communication session.

Figure 5:
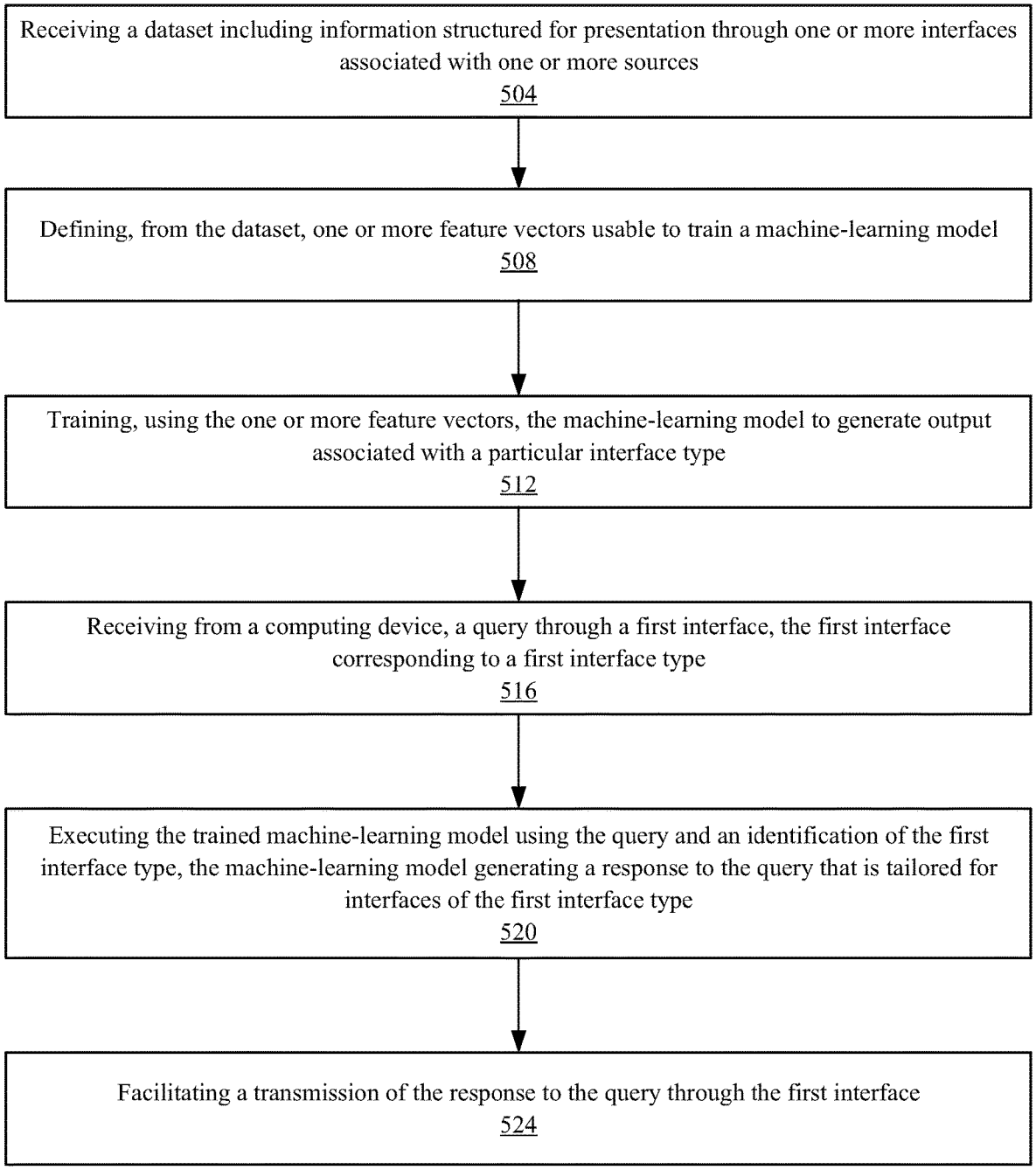
FIG. 5 illustrates a flowchart of an example process for generating query responses by translating unified data types into interface-specific representations according to aspects of the present disclosure.

FIG. 5 illustrates a flowchart of an example process for generating query responses by translating unified data types into interface-specific representations according to aspects of the present disclosure. At block 504, a computing device receives a dataset from one or more sources (e.g., computing devices, mobile devices, databases, servers, websites, etc.). The dataset may include structured and/or unstructured data that was generated, stored, presented, transmitted, received, derived, and/or the like by the one or more sources. For example, the one such source may be a website associated with a product or company. The dataset may include some unstructured data and some structured data presented by the webpage associated with the product or company.

At block 508, the computing device may define one or more features vectors from the dataset. The one or more features vectors may include a sequence of features of the dataset (or derived from the dataset). The sequence may be organized according to a particular feature dimension (e.g., such as time, frequency, etc.). In some examples, the feature vector may be usable to train a machine-learning model to generate natural language representations of the data included in the dataset tailored according to a particular interface type. The feature vector may include one or more communications from a communication session, characteristics of those communications, an identification of an interface type over which the communications were transmitted or received, metadata associated with the communications and/or communication session, information associated with the two or more entities (e.g., users, automated services, agents, and/or the like) communicating over the communication session (e.g., demographic information such as, but not limited to age, gender, location, etc.; characteristics of devices through which the entities are communicating over the communication session; and/or the like). The feature vectors derived from the dataset may be usable to train machine-learning models to generate communications using a similar or same orthography as the communications of the dataset such that the generated communications appear similar (e.g., in terms of grammar, punctuation, spelling, sentence structure, diction, abbreviation, etc.) to other communications transmitted over that communication protocol.

At block 512, a machine learning model may be trained using the one or more feature vectors to define an orthography usable by the machine-learning model, another machine-learning model, and/or other processes to generate communications tailored to a particular interface type. Each interface type may be associated with particular communication norms such as, but not limited to, particular diction, grammar, punctuation, sentence structure, spelling, abbreviations, and/or the like. For example, information may be written in a formal orthography (e.g., proper grammar, spelling, punctuation, etc.) for a webpage, while information transmitted over text messaging may be conveyed using a less formal orthography (e.g., using little punctuation, using additional abbreviations, incomplete sentence structures, emojis, etc.). Examples of interface types include, but are not limited to, an instant messaging service, text messaging service, telephony, email, a webform, direct communication, a hardware interface (e.g., such as a network interface, input/output interface, etc.), and/or the like. The computing device may identify an interface type that corresponds to the first interface to tailor a response to the first interface. The communication may include a request for information (e.g., a query), a response to a previous communication, and/or the like.

The machine-learning model may be trained using unsupervised learning, supervised learning, semi-supervised, reinforcement learning, and/or the like over a predetermined quantity of iterations and/or until a predetermined accuracy is reached. Examples of such machine-learning models may include, but are not limited to recurrent neural networks, deep learning networks, concurrent neural network, generative adversarial networks, statistical classifiers, decision trees, and/or the like.

For example, the machine-learning model may be a generative adversarial network (GAN) that includes two machine-learning models. In those instances, the first machine-learning model may be configured to generate communications in a particular orthography that corresponds to an interface type and the second machine-learning model may be configured to classify communications from the first machine-learning model as corresponding to the interface type. The results from the second machine-learning model may be passed to the first machine-learning model to improve subsequent communications generated by the first machine-learning model. The first machine-learning model may be trained using the feature vectors of the dataset. The second machine-learning model may be trained using a combination of feature vectors of the dataset and the output generated by the first machine-learning model. The goal of the first machine-learning model may be to generate communications that the second machine-learning model fails to identify a particular communication as being non-human generated and/or fails to identify as not corresponding to a particular interface.

In some examples, the computing device may include multiple machine-learning models. Each machine-learning model may be configured to execute one or more processes such as classifying communications according interface types, defining natural language orthographies tailored interface types, generating communications with defined orthographies, combinations thereof, or the like. The output of each machine-learning model may be passed as input into another machine-learning model (e.g., executing a subsequent process).

In some instances, the feature vector may be processed by a non-machine-learning process or algorithm. In those instances, an orthography may be predefined for each interface type using the feature vectors (e.g., using one or more software processes, user input, and/or the like). Once defined, one or more software processes may generate natural language communications tailored to an interface type using the defined orthography that corresponds to the interface type.

At block 516, the computing device may then receive a communication from a client device through a first interface that corresponds to a particular interface type. In some examples, a user operating the client device may establish a communication session with an agent and/or automated service (such as a software bot, agent assist, and/or the like). During the communication session, the user may transmit a communication that may correspond to or may be interpreted (by the agent and/or automated service as an information request (e.g., a query).

At block 520, the computing device may execute the trained machine-learning model using a feature vector derived from the information request to generate a communication response. The feature vector may include the information request; an identification of the particular interface type; information associated with the client device and/or the user(s) thereof, the agent and/or any devices operated by the agent during the communication session, the automated service and/or any devices operated or accessed by the automated service; and/or the like. The trained machine-learning model may execute to identify the information requested by the information request and generate a natural language communication based on the identified information that is tailored to the particular interface type. In some instances, the natural language communication may be further tailored based on the information associated with the client device and/or the user(s) thereof to generate communications that may appear as if generated by a human having similar characteristics (e.g., age, location, gender, socio-economic background, etc.).

For example, the communication transmitted by the client device may include a text string: "is the store open today?". The machine-learning model may process the communication as a request for "store hours" associated with a particular time interval (e.g., today) and a particular store (e.g., stores that may be contextually relevant to the communication or the user such as a store that was previously identified in the communication session, a store that is closest to the user, etc.). The machine-learning model may then access database(s) of unified data types storing information received and/or derived from set of information sources (e.g., websites, databases, servers, computing devices, client devices, mobile devices, historical communication sessions, etc.) and identify a unified data type storing information corresponding to store hours that correspond to the particular store. The machine-learning model may then translate the unified data type to a natural language communication response that corresponds to the particular interface type.

At block 524, the computing device may facilitate a transmission of the communication response through the first interface. In some instances, the client device may be communicating with the computing device through the first interface. In those instances, the computing device may transmit the response through the first interface. In other instances, the client device may be communicating with another device through the computing device. In those instances, the computing device may facilitate the transmission of the response by transmitting the response to the client device through the first interface or causing the other device to transmit the response through the first interface. In still yet other instances, the client device may be communicating with another device and the other device may be in communication with the computing device. In those instances, the computing device may facilitate the transmission of the communication response by transmitting the response to the other device and the other device may then transmit the response to the client device.

Figure 6:
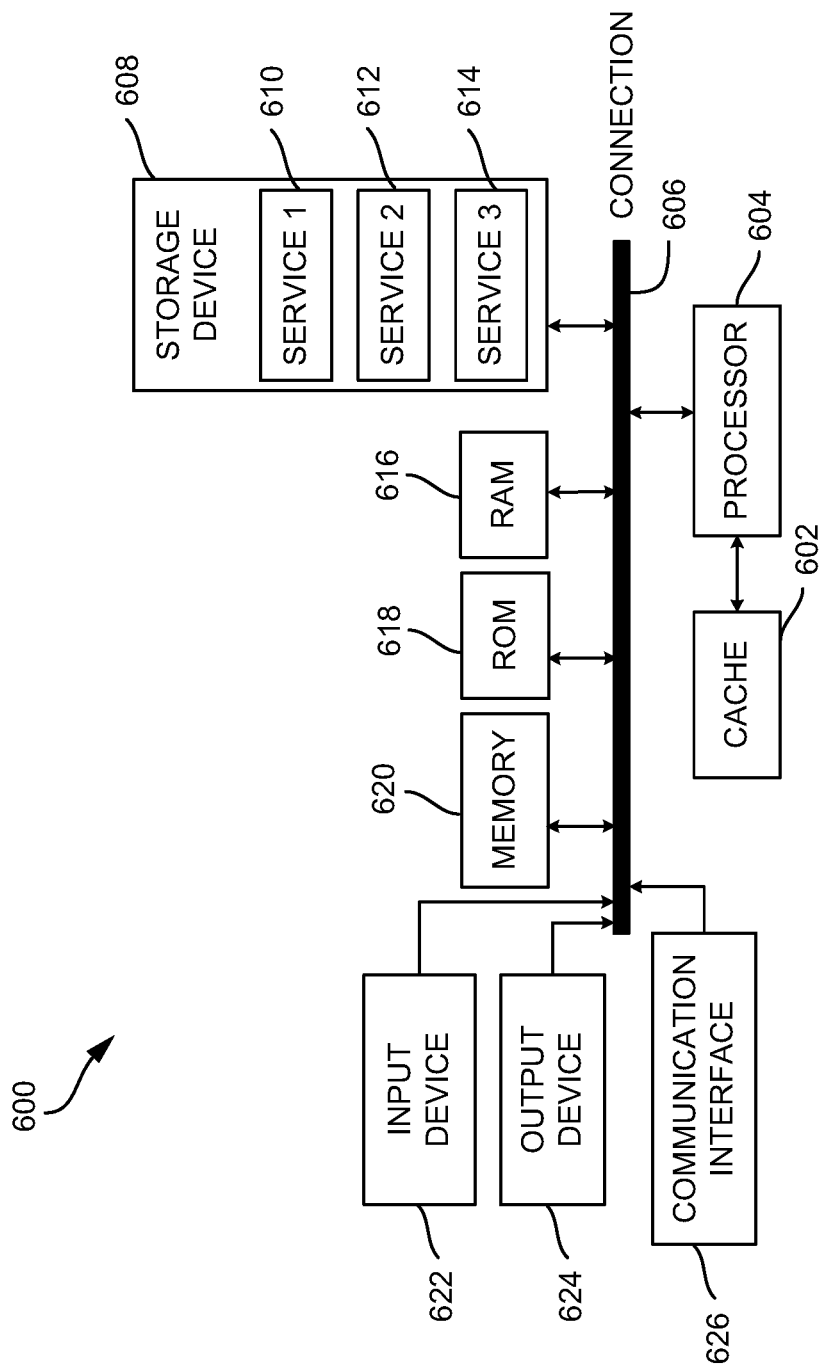
FIG. 6 illustrates an example computing device architecture of an example computing device that can implement the various techniques described herein according to aspects of the present disclosure.

FIG. 6 illustrates an example computing device according to aspects of the present disclosure. For example, computing device 600 can implement any of the systems or methods described herein. In some instances, computing device 600 may be a component of or included within a media device. The components of computing device 600 are shown in electrical communication with each other using connection 606, such as a bus. The example computing device architecture 600 includes a processor (e.g., CPU, processor, or the like) 604 and connection 606 (e.g., such as a bus, or the like) that is configured to couple components of computing device 600 such as, but not limited to, memory 620, read only memory (ROM) 618, random access memory (RAM) 616, and/or storage device 608, to processing unit 610.

Computing device 600 can include a cache 602 of high-speed memory connected directly with, in close proximity to, or integrated within processor 604. Computing device 600 can copy data from memory 620 and/or storage device 608 to cache 602 for quicker access by processor 604. In this way, cache 602 may provide a performance boost that avoids delays while processor 604 waits for data. Alternatively, processor 604 may access data directly from memory 620, ROM 817, RAM 616, and/or storage device 608. Memory 620 can include multiple types of homogenous or heterogeneous memory (e.g., such as, but not limited to, magnetic, optical, solid-state, etc.).

Storage device 608 may include one or more non-transitory computer-readable media such as volatile and/or non-volatile memories. A non-transitory computer-readable medium can store instructions and/or data accessible by computing device 600. Non-transitory computer-readable media can include, but is not limited to magnetic cassettes, hard-disk drives (HDD), flash memory, solid state memory devices, digital versatile disks, cartridges, compact discs, random access memories (RAMs) 625, read only memory (ROM) 620, combinations thereof, or the like.

Storage device 608, may store one or more services, such as service 2 610, service 2 612, and service 3 614, that are executable by processor 604 and/or other electronic hardware. The one or more services include instructions executable by processor 604 to: perform operations such as any of the techniques, steps, processes, blocks, and/or operations described herein; control the operations of a device in communication with computing device 600; control the operations of processing unit 610 and/or any special-purpose processors; combinations therefor; or the like. Processor 604 may be a system on a chip (SOC) that includes one or more cores or processors, a bus, memories, clock, memory controller, cache, other processor components, and/or the like. A multi-core processor may be symmetric or asymmetric.

Computing device 600 may include one or more input devices 622 that may represent any number of input mechanisms, such as a microphone, a touch-sensitive screen for graphical input, keyboard, mouse, motion input, speech, media devices, sensors, combinations thereof, or the like. Computing device 600 may include one or more output devices 624 that output data to a user. Such output devices 624 may include, but are not limited to, a media device, projector, television, speakers, combinations thereof, or the like. In some instances, multimodal computing devices can enable a user to provide multiple types of input to communicate with computing device 600. Communications interface 626 may be configured to manage user input and computing device output. Communications interface 626 may also be configured to managing communications with remote devices (e.g., establishing connection, receiving/transmitting communications, etc.) over one or more communication protocols and/or over one or more communication media (e.g., wired, wireless, etc.).

Computing device 600 is not limited to the components as shown if FIG. 6. Computing device 600 may include other components not shown and/or components shown may be omitted.

The following examples describe possible implementations of aspects of the present disclosure. The examples are non-exhaustive and interchangeable. As used below, any reference to a series of examples is to be understood as a reference to each of those examples disjunctively (e.g., "Examples 1-4" is to be understood as "Examples 1, 2, 3, or 4").

Example 1 is a method comprising: receiving, from one or more sources, a dataset including information structured for presentation through one or more interfaces associated with the one or more sources; defining, from the dataset, one or more feature vectors usable to train a machine-learning model; training, using the one or more feature vectors, the machine-learning model to generate output associated with a particular interface type; receiving from a computing device, a query through a first interface, the first interface corresponding to a first interface type; executing the trained machine-learning model using the query and an identification of the first interface type, the machine-learning model generating a response to the query that includes a structure tailored for interfaces of the first interface type; and facilitating a transmission of the response to the query through the first interface.

Example 2 is the method of example(s) 1 and 3-10, wherein the dataset includes structured, alphanumeric strings.

Example 3 is the method any of example(s) 1-2 and 4-10, wherein the dataset includes audio segments.

Example 4 is the method any of example(s) 1-3 and 5-10, wherein the first interface type corresponds to a user interface through which the computing device transmits and receives textual communications.

Example 5 is the method any of example(s) 1-4 and 6-10, wherein the first interface type corresponds to a user interface for communicating over text messaging.

Example 6 is the method any of example(s) 1-5 and 7-10, wherein the first interface type corresponds to a user interface of a webpage.

Example 7 is the method of any of example(s) 1-6 and 8-10, wherein each feature vector of the one or more feature vectors includes features associated with an interface of a source through which the information is presented.

Example 8 is the method of any of example(s) 1-7 and 9-10, wherein each feature vector of the one or more feature vectors includes features corresponding to a syntax and structure of the information.

Example 9 is the method of any of example(s) 1-8 and 10, wherein the response to the query further includes a syntax tailored to interfaces of the first interface type.

Example 10 is the method of any of example(s) 1-9, further comprising: receiving from the computing device input associated with the response to the query, the input indicative of an accuracy metric associated with the response generated by the machine-learning model; generating a feature vector using the query, the response, and the input; and modifying the machine-learning model using the feature vector, wherein the machine-learning model, once modified, is configured to generate responses to queries with an increased accuracy metric.

Example 11 is a system comprising: one or more processors; and a non-transitory machine-readable storage medium storing instructions that when executed by the one or more processors, cause the one or more processors to perform the methods of any of example(s)s 1-10.

Example 10 is a non-transitory machine-readable storage medium storing instructions that when executed by one or more processors, cause the one or more processors to perform the methods of any of example(s)s 1-11.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored in a form that excludes carrier waves and/or electronic signals. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Some portions of this description describe examples in terms of algorithms and symbolic representations of operations on information. These operations, while described functionally, computationally, or logically, may be implemented by computer programs or equivalent electrical circuits, microcode, or the like. Furthermore, arrangements of operations may be referred to as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module can be implemented with a computer-readable medium storing computer program code, which can be executed by a processor for performing any or all of the steps, operations, or processes described.

Some examples may relate to an apparatus or system for performing any or all of the steps, operations, or processes described. The apparatus or system may be specially constructed for the required purposes, and/or it may comprise a general-purpose computing device selectively activated or reconfigured by a computer program stored in memory of computing device. The memory may be or include a non-transitory, tangible computer readable storage medium, or any type of media suitable for storing electronic instructions, which may be coupled to a bus. Furthermore, any computing systems referred to in the specification may include a single processor or multiple processors.

While the present subject matter has been described in detail with respect to specific examples, it will be appreciated that those skilled in the art, upon attaining an understanding of the foregoing, may readily produce alterations to, variations of, and equivalents to such embodiments. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, the present disclosure has been presented for purposes of example rather than limitation, and does not preclude the inclusion of such modifications, variations, and/or additions to the present subject matter as would be readily apparent to one of ordinary skill in the art.

For clarity of explanation, in some instances the present disclosure may be presented as including individual functional blocks including functional blocks comprising devices, device components, steps or routines in a method embodied in software, or combinations of hardware and software. Additional functional blocks may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual examples may be described herein as a process or method which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not shown. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

Devices implementing the methods and systems described herein can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. The program code may be executed by a processor, which may include one or more processors, such as, but not limited to, one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A processor may be a microprocessor; conventional processor, controller, microcontroller, state machine, or the like. A processor may also be implemented as a combination of computing components (e.g., a combination of a DSP and a microprocessor, a plurality of microprocessors, one or more microprocessors in conjunction with a DSP core, or any other such configuration). Accordingly, the term "processor," as used herein may refer to any of the foregoing structure, any combination of the foregoing structure, or any other structure or apparatus suitable for implementation of the techniques described herein. Functionality described herein also can be embodied in peripherals or add-in cards. Such functionality can also be implemented on a circuit board among different chips or different processes executing in a single device, by way of further example.

In the foregoing description, aspects of the disclosure are described with reference to specific examples thereof, but those skilled in the art will recognize that the disclosure is not limited thereto. Thus, while illustrative examples of the disclosure have been described in detail herein, it is to be understood that the inventive concepts may be otherwise variously embodied and employed, and that the appended claims are intended to be construed to include such variations. Various features and aspects of the above-described disclosure may be used individually or in any combination. Further, examples can be utilized in any number of environments and applications beyond those described herein without departing from the broader spirit and scope of the disclosure. The disclosure and figures are, accordingly, to be regarded as illustrative rather than restrictive.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or media devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular usc contemplated. It is intended that the scope of the technology be defined by the claim.

The invention claimed is:

1. A method comprising:
receiving, from one or more sources, a dataset including information structured for presentation through one or more interfaces associated with the one or more sources;
defining, from the dataset, one or more feature vectors usable to train a machine-learning model;
training, using the one or more feature vectors, the machine-learning model to generate output associated with a particular interface type;
receiving from a computing device, a communication including a query through a first communication interface, the first communication interface corresponding to an first interface type;
generating a natural language communication including a response to the query, wherein the natural language communication is represented in a structure tailored for interfaces of the first interface type, and wherein the natural language communication is generated by a machine-learning model using unified data types stored in a database;
facilitating a transmission of the response to the query through the first communication interface;
receiving, from the computing device, an input associated with the response to the query the input indicative of an accuracy metric associated with the response generated by the machine-learning model;
generating a feature vector using the query, the response, and the input; and
modifying the machine-learning model using the feature vector, wherein the machine-learning model, once modified, is configured to generate responses to queries with an increased accuracy metric.

2. The method of claim 1, wherein the dataset includes audio segments.

3. The method of claim 1, wherein the first interface type corresponds to a user interface through which the computing device transmits and receives textual communications.

4. The method of claim 1, wherein the first interface type corresponds to a user interface for communicating over text messaging.

5. The method of claim 1, wherein the first interface type corresponds to a user interface of a webpage.

6. The method of claim 1, wherein each feature vector of the one or more feature vectors includes features associated with an interface of a source through which the information is presented.

7. The method of claim 1, wherein the interface type is a telephony-based interface.

8. A system comprising:
one or more processors; and
a non-transitory machine-readable storage medium storing instructions that when executed by the one or more processors, cause the one or more processors to perform operations including:
receiving, from one or more sources, a dataset including information structured for presentation through one or more interfaces associated with the one or more sources;
defining, from the dataset, one or more feature vectors usable to train a machine-learning model;
training, using the one or more feature vectors, the machine-learning model to generate output associated with a particular interface type;
receiving from a computing device, a communication including a query through a communication interface, the communication interface corresponding to an interface type;
generating a natural language communication including a response to the query, wherein the natural language communication is represented in a structure tailored for interfaces of the interface type, and wherein the natural language communication is generated by a machine-learning model using unified data types stored in a database;
facilitating a transmission of the response to the query through the communication interface;
receiving, from the computing device, an input associated with the response to the query, the input indicative of an accuracy metric associated with the response generated by the machine-learning model;
generating a feature vector using the query, the response, and the input; and
modifying the machine-learning model using the feature vector, wherein the machine-learning model, once modified, is configured to generate responses to queries with an increased accuracy metric.

9. The system of claim 8, wherein the dataset includes audio segments.

10. The system of claim 8, wherein the interface type corresponds to a user interface through which the computing device transmits and receives textual communications.

11. The system of claim 8, wherein the interface type corresponds to a user interface for communicating over text messaging.

12. The system of claim 8, wherein the interface type corresponds to a user interface of a webpage.

13. The system of claim 8, wherein each feature vector of the one or more feature vectors includes features associated with an interface of a source through which the information is presented.

14. The system of claim 8, wherein the interface type is a telephony-based interface.

15. A non-transitory machine-readable storage medium storing instructions that when executed by one or more processors, cause the one or more processors to perform operations including:
receiving, from one or more sources, a dataset including information structured for presentation through one or more interfaces associated with the one or more sources;
defining, from the dataset, one or more feature vectors usable to train a machine-learning model;
training, using the one or more feature vectors, the machine-learning model to generate output associated with a particular interface type;
receiving from a computing device, a communication including a query through a communication interface, the communication interface corresponding to an interface type;
generating a natural language communication including a response to the query, wherein the natural language communication is represented in a structure tailored for interfaces of the interface type, and wherein the natural language communication is generated by a machine-learning model using unified data types stored in a database;
facilitating a transmission of the response to the query through the communication interface;
receiving, from the computing device, an input associated with the response to the query, the input indicative of an accuracy metric associated with the response generated by the machine-learning model;

generating a feature vector using the query, the response, and the input; and modifying the machine-learning model using the feature vector, wherein the machine-learning model, once modified, is configured to generate responses to queries with an increased accuracy metric.

16. The non-transitory machine-readable storage medium of claim 15, wherein the dataset includes audio segments.

17. The non-transitory machine-readable storage medium of claim 15, wherein the interface type corresponds to a user interface through which the computing device transmits and receives textual communications.

18. The non-transitory machine-readable storage medium of claim 15, wherein the interface type corresponds to a user interface for communicating over text messaging.

19. The non-transitory machine-readable storage medium of claim 15, wherein each feature vector of the one or more feature vectors includes features associated with an interface of a source through which the information is presented.

20. The non-transitory machine-readable storage medium of claim 15, wherein the interface type is a telephony-based interface.

* * * * *